US012574190B2

(12) United States Patent
Park et al.

(10) Patent No.: US 12,574,190 B2
(45) Date of Patent: \*Mar. 10, 2026

(54) TECHNIQUES AND APPARATUSES FOR USING MINI-SLOTS FOR HYBRID AUTOMATIC REPEAT REQUEST (HARQ) TRANSMISSIONS

(71) Applicant: QUALCOMM Incorporated, San Diego, CA (US)

(72) Inventors: Jeonghun Park, Seoul (KR); Chong Li, Weehawken, NJ (US); Seyedkianoush Hosseini, San Diego, CA (US); Wanshi Chen, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/764,463

(22) Filed: Jul. 5, 2024

(65) Prior Publication Data

US 2024/0364481 A1 Oct. 31, 2024

Related U.S. Application Data

(63) Continuation of application No. 16/947,751, filed on Aug. 14, 2020, now Pat. No. 12,052,197, which is a
(Continued)

(51) Int. Cl.
| | |
|---|---|
| *H04L 5/00* | (2006.01) |
| *H04B 17/336* | (2015.01) |
(Continued)

(52) U.S. Cl.
CPC .............. *H04L 5/0055* (2013.01); *H04L 1/08* (2013.01); *H04L 1/1812* (2013.01);
(Continued)

(58) Field of Classification Search
CPC ....... H04L 1/08; H04L 1/1812; H04L 1/1887; H04L 1/1896; H04L 5/0055; H04B 17/336
See application file for complete search history.

(56) References Cited

U.S. PATENT DOCUMENTS

| | | | |
|---|---|---|---|
| 9,445,344 | B1 | 9/2016 | Oroskar et al. |
| 10,771,225 | B2 | 9/2020 | Park et al. |
(Continued)

FOREIGN PATENT DOCUMENTS

| | | |
|---|---|---|
| CN | 101179361 A | 5/2008 |
| CN | 101753274 A | 6/2010 |
(Continued)

OTHER PUBLICATIONS

CATT: "Discussion on HARQ Management and HARQ-ACK Feedback", 3GPP TSG RAN WG1 Meeting #90bis, 3GPP Draft; R1-1717834, 3rd Generation Partnership Project (3GPP), Mobile Competence Centre, 650, Route Des Lucioles, F-06921 Sophia-Antipolis Cedex, France, vol. RAN WG1, No. Prague. CZ; 20171009-20171013, Oct. 3, 2017 (Oct. 3, 2017), XP051352789, 7 Pages.
(Continued)

*Primary Examiner* — Melanie Jagannathan
(74) *Attorney, Agent, or Firm* — Harrity & Harrity, LLP

(57) ABSTRACT

Certain aspects of the present disclosure generally relate to wireless communication. In some aspects, a user equipment may receive, from a base station, an indicator associated with a hybrid automatic repeat request (HARQ) process, wherein the indicator indicates a number of mini-slots to be bundled for a HARQ transmission of the HARQ process; and decode the HARQ transmission based at least in part on the mini-slots. In some aspects, a base station may transmit an indicator, associated with a HARQ process, to a user equipment, wherein the indicator indicates a number of mini-slots to be bundled
(Continued)

for a HARQ transmission of the HARQ process; and transmit the HARQ transmission to the user equipment using the mini-slots. Numerous other aspects are provided.

15 Claims, 17 Drawing Sheets

Related U.S. Application Data continuation of application No. 16/174,575, filed on Oct. 30, 2018, now Pat. No. 10,771,225.

(60) Provisional application No. 62/588,116, filed on Nov. 17, 2017.

(51) Int. Cl.
| | |
|---|---|
| *H04L 1/08* | (2006.01) |
| *H04L 1/1812* | (2023.01) |
| *H04L 1/1867* | (2023.01) |
| *H04W 84/04* | (2009.01) |

(52) U.S. Cl.
CPC .......... *H04L 1/1887* (2013.01); *H04L 1/1896* (2013.01); *H04B 17/336* (2015.01); *H04W 84/045* (2013.01)

(56) References Cited

U.S. PATENT DOCUMENTS

| | | |
|---|---|---|
| 2013/0250903 A1 | 9/2013 | Ahn et al. |
| 2014/0126553 A1 | 5/2014 | Li et al. |
| 2016/0020891 A1 | 1/2016 | Jung et al. |
| 2016/0112824 A1 | 4/2016 | Tuset Peiróet al. |
| 2016/0226629 A1 | 8/2016 | Liu et al. |
| 2016/0295561 A1 | 10/2016 | Papasakellariou |
| 2017/0013565 A1 | 1/2017 | Pelletier et al. |
| 2017/0026940 A1 | 1/2017 | Moulsley |
| 2017/0041923 A1 | 2/2017 | Park |
| 2017/0141859 A1 | 5/2017 | Seo et al. |
| 2017/0290002 A1 | 10/2017 | Subramanian et al. |
| 2017/0303317 A1 | 10/2017 | Islam et al. |
| 2018/0191470 A1 | 7/2018 | Manolakos et al. |
| 2018/0212717 A1 | 7/2018 | Yang et al. |
| 2018/0212718 A1 | 7/2018 | Takeda et al. |
| 2018/0234955 A1 | 8/2018 | Lin |
| 2018/0242319 A1 | 8/2018 | Akkarakaran et al. |
| 2018/0278454 A1 | 9/2018 | Islam et al. |
| 2018/0279330 A1 | 9/2018 | Hong et al. |
| 2018/0332608 A1 | 11/2018 | Guo et al. |
| 2019/0037561 A1 | 1/2019 | Jung et al. |
| 2019/0082456 A1 | 3/2019 | Kim et al. |
| 2019/0158251 A1 | 5/2019 | Park et al. |
| 2019/0165904 A1* | 5/2019 | Jo ......................... H04L 5/0053 |
| 2019/0379487 A1 | 12/2019 | Hwang et al. |
| 2019/0386785 A1 | 12/2019 | Zhou |
| 2020/0015256 A1 | 1/2020 | Lee et al. |
| 2020/0059821 A1 | 2/2020 | Wirth et al. |
| 2020/0092047 A1 | 3/2020 | Yeo et al. |
| 2020/0106559 A1* | 4/2020 | Vilaipornsawai ..... H04L 1/1896 |
| 2020/0196335 A1 | 6/2020 | Lei et al. |
| 2020/0245395 A1 | 7/2020 | Zhang et al. |
| 2020/0374090 A1 | 11/2020 | Park et al. |
| 2021/0144700 A1 | 5/2021 | Lee et al. |
| 2021/0289522 A1 | 9/2021 | Salim et al. |
| 2023/0155748 A1* | 5/2023 | Lee ....................... H04L 1/1819 370/329 |
| 2024/0057108 A1 | 2/2024 | Yi et al. |
| 2025/0063558 A1* | 2/2025 | Li ..................... H04W 72/0457 |
| 2025/0212239 A1* | 6/2025 | Andersson ............ H04L 5/0044 |

FOREIGN PATENT DOCUMENTS

| | | |
|---|---|---|
| CN | 104067549 A | 9/2014 |
| CN | 104938010 A | 9/2015 |
| CN | 105075361 A | 11/2015 |
| CN | 106160987 A | 11/2016 |
| CN | 107113122 A | 8/2017 |
| KR | 20080064069 A | 7/2008 |
| TW | 201737650 A | 10/2017 |
| WO | 2017192019 A1 | 11/2017 |
| WO | 2017194000 A1 | 11/2017 |

OTHER PUBLICATIONS

International Search Report and Written Opinion—PCT/US2018/058386—ISA/EPO—May 23, 2019.

Ntt Docomo, Inc: "DL/UL Scheduling and HARQ Management", 3GPP TSG RAN WG1 Meeting 90bis, 3GPP Draft, R1-1718217, 3rd Generation Partnership Project (3GPP), Mobile Competence Centre, 650, Route Des Lucioles, F-06921 Sophia-Antipolis Cedex, France, vol. RAN WG1, No. Prague. CZ; Oct. 9, 2017-Oct. 13, 2017, Oct. 3, 2017 (Oct. 3, 2017), pp. 1-14, XP051352925.

Partial International Search Report—PCT/US2018/058386—ISA/EPO—Mar. 29, 2019.

Taiwan Search Report—TW107138580—TIPO—Dec. 15, 2021.

Ntt Docomo, Inc: "Views on HARQ enhancements for NR", 3GPP TSG RAN WG1 Meeting #88bis, R1-1705749, France, vol. RAN WG1, No. Spokane, USA, Apr. 2, 2017, 5 Pages, XP051243864.

* cited by examiner

700

702    704    706

PDCCH

UL Short
Burst Portion

DL Data

750

704    706

708

702

708

PDCCH

UL Short
Burst Portion

DL Data

Mini-slot for
HARQ

1310 — Receive, from a base station (BS), an indicator associated with a hybrid automatic repeat request (HARQ) process, wherein the indicator indicates a number of mini-slots to be bundled for a HARQ transmission of the HARQ process 1320 — Decode the HARQ transmission based at least in part on the mini-slots

1300

1410 — Transmit an indicator, associated with a hybrid automatic repeat request (HARQ) process, to a user equipment (UE), wherein the indicator indicates a number of mini-slots to be bundled for a HARQ transmission of the HARQ process 1420 — Transmit the HARQ transmission to the UE using the mini-slots

1400

TECHNIQUES AND APPARATUSES FOR USING MINI-SLOTS FOR HYBRID AUTOMATIC REPEAT REQUEST (HARQ) TRANSMISSIONS

CROSS-REFERENCE TO RELATED APPLICATIONS UNDER 35 U.S.C. § 119

This application is a continuation of U.S. patent application Ser. No. 16/947,751, filed on Aug. 14, 2020, which is a continuation of U.S. patent application Ser. No. 16/174,575, filed on Oct. 30, 2018 (now U.S. Pat. No. 10,771,225), entitled "TECHNIQUES AND APPARATUSES FOR USING MINI-SLOTS FOR HYBRID AUTOMATIC REPEAT REQUEST (HARQ) TRANSMISSIONS," which claims priority to U.S. Provisional Patent Application No. 62/588,116, filed on Nov. 17, 2017, entitled "TECHNIQUES AND APPARATUSES FOR USING MINI-SLOTS FOR HYBRID AUTOMATIC REPEAT REQUEST (HARQ) TRANSMISSIONS." The contents of each of the above applications are incorporated herein by reference in their entireties.

FIELD OF THE DISCLOSURE

Aspects of the present disclosure generally relate to wireless communication, and more particularly to techniques and apparatuses using mini-slots for hybrid automatic repeat request (HARQ) transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include receiving, from a base station (BS), an indicator associated with a hybrid automatic repeat request (HARQ) process, wherein the indicator indicates a number of mini-slots to be bundled for a HARQ transmission of the HARQ process; and decoding the HARQ transmission based at least in part on the mini-slots.

In some aspects, a user equipment for wireless communication may include memory and one or more processors operatively coupled to the memory. The memory and the one or more processors may be configured to receive, from a base station (BS), an indicator associated with a hybrid automatic repeat request (HARQ) process, wherein the indicator indicates a number of mini-slots to be bundled for a HARQ transmission of the HARQ process; and decode the HARQ transmission based at least in part on the mini-slots.

In some aspects, a non-transitory computer-readable medium may store one or more instructions for wireless communication. The one or more instructions, when executed by one or more processors of a user equipment, may cause the one or more processors to receive, from a base station (BS), an indicator associated with a hybrid automatic repeat request (HARQ) process, wherein the indicator indicates a number of mini-slots to be bundled for a HARQ transmission of the HARQ process; and decode the HARQ transmission based at least in part on the mini-slots.

In some aspects, an apparatus for wireless communication may include means for receiving, from a base station (BS), an indicator associated with a hybrid automatic repeat request (HARQ) process, wherein the indicator indicates a number of mini-slots to be bundled for a HARQ transmission of the HARQ process; and means for decoding the HARQ transmission based at least in part on the mini-slots.

In some aspects, a method of wireless communication may include transmitting an indicator, associated with a hybrid automatic repeat request (HARQ) process, to a user equipment (UE), wherein the indicator indicates a number of mini-slots to be bundled for a HARQ transmission of the HARQ process; and transmitting the HARQ transmission to the UE using the mini-slots.

In some aspects, a base station for wireless communication may include memory and one or more processors operatively coupled to the memory. The memory and the one or more processors may be configured to transmit an indicator, associated with a hybrid automatic repeat request (HARQ) process, to a user equipment (UE), wherein the indicator indicates a number of mini-slots to be bundled for a HARQ transmission of the HARQ process; and transmit the HARQ transmission to the UE using the mini-slots.

In some aspects, a non-transitory computer-readable medium may store one or more instructions for wireless communication. The one or more instructions, when executed by one or more processors of a base station, may cause the one or more processors to transmit an indicator, associated with a hybrid automatic repeat request (HARQ) process, to a user equipment (UE), wherein the indicator indicates a number of mini-slots to be bundled for a HARQ transmission of the HARQ process; and transmit the HARQ transmission to the UE using the mini-slots.

In some aspects, an apparatus for wireless communication may include means for transmitting an indicator, associated with a hybrid automatic repeat request (HARQ) process, to a user equipment (UE), wherein the indicator indicates a number of mini-slots to be bundled for a HARQ transmission of the HARQ process; and means for transmitting the HARQ transmission to the UE using the mini-slots.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 11A and 11B are diagrams illustrating examples of non-acknowledgement signaling used with mini-slots for HARQ transmissions, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
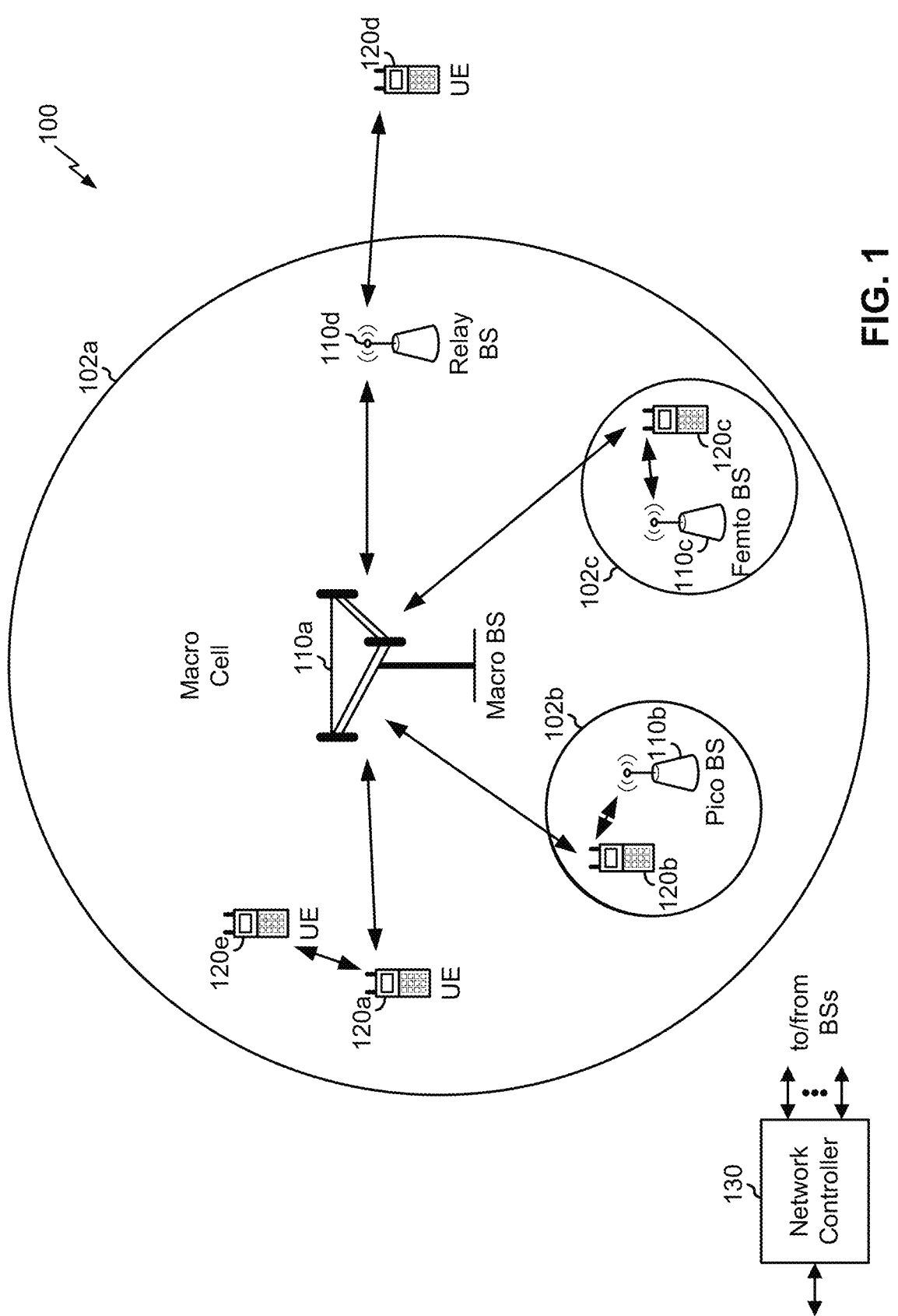
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
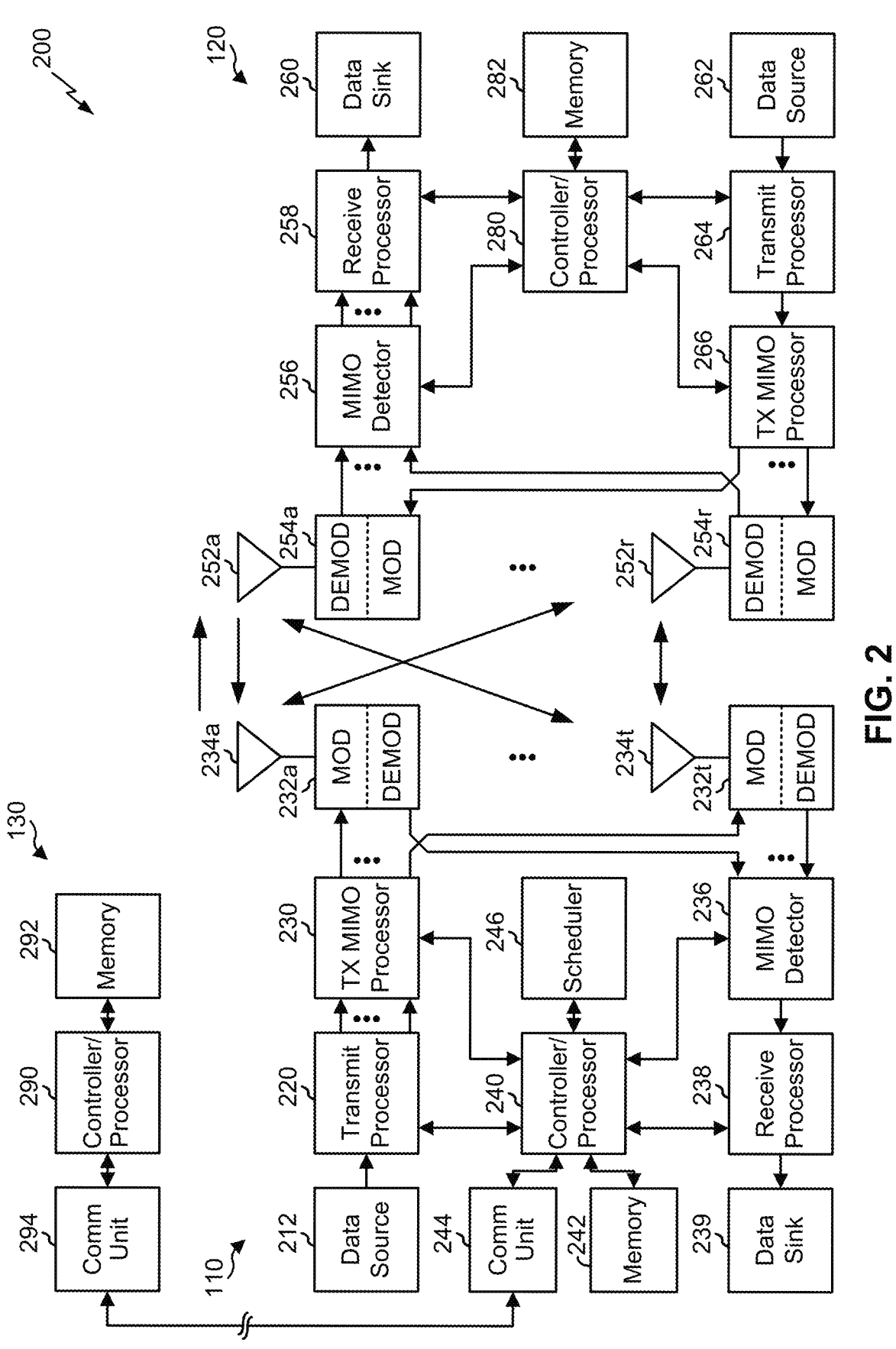
FIG. 2 is a block diagram conceptually illustrating an example of a base station in communication with a user equipment (UE) in a wireless communication network, in accordance with various aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols.

A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with using mini-slots for hybrid automatic repeat request (HARQ) transmissions, as described in more detail elsewhere herein. For example, controller/processor 240 of base station 110, controller/processor 280 of UE 120, and/or any other component(s) of FIG. 2 may perform or direct operations of, for example, process 1300 of FIG. 13, process 1400 of FIG. 14, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a base station (BS), an indicator associated with a hybrid automatic repeat request (HARQ) process, wherein the indicator indicates a number of mini-slots to be bundled for a HARQ transmission of the HARQ process; means for decoding the HARQ transmission based at least in part on the mini-slots; and/or the like. In some aspects, such means may include one or more components of UE 120 described in connection with FIG. 2.

In some aspects, base station 110 may include means for transmitting an indicator, associated with a hybrid automatic repeat request (HARQ) process, to a user equipment (UE), wherein the indicator indicates a number of mini-slots to be bundled for a HARQ transmission of the HARQ process; means for transmitting the HARQ transmission to the UE using the mini-slots; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
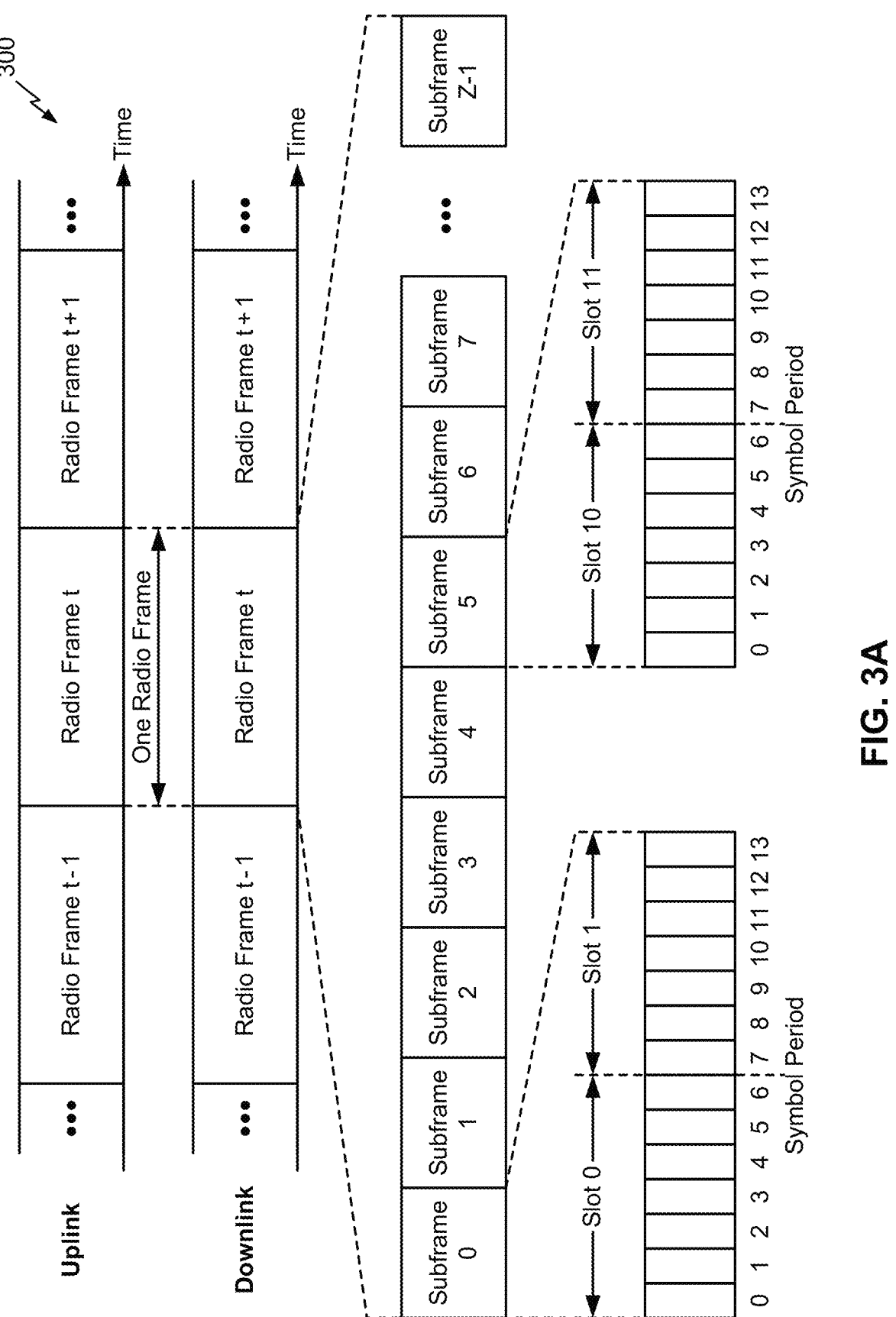
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR) in accordance with various aspects of the present disclosure. The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
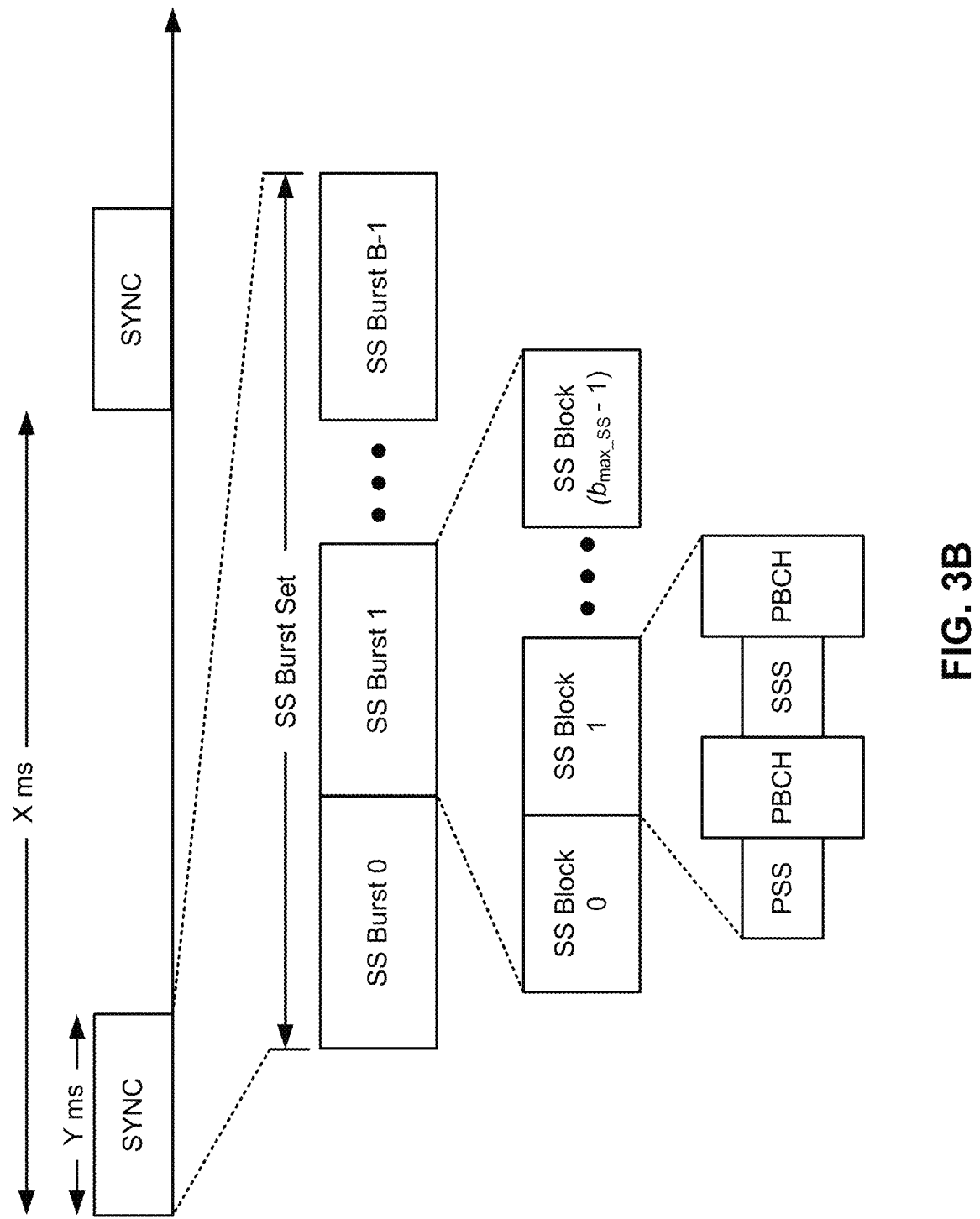
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy in accordance with various aspects of the present disclosure. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
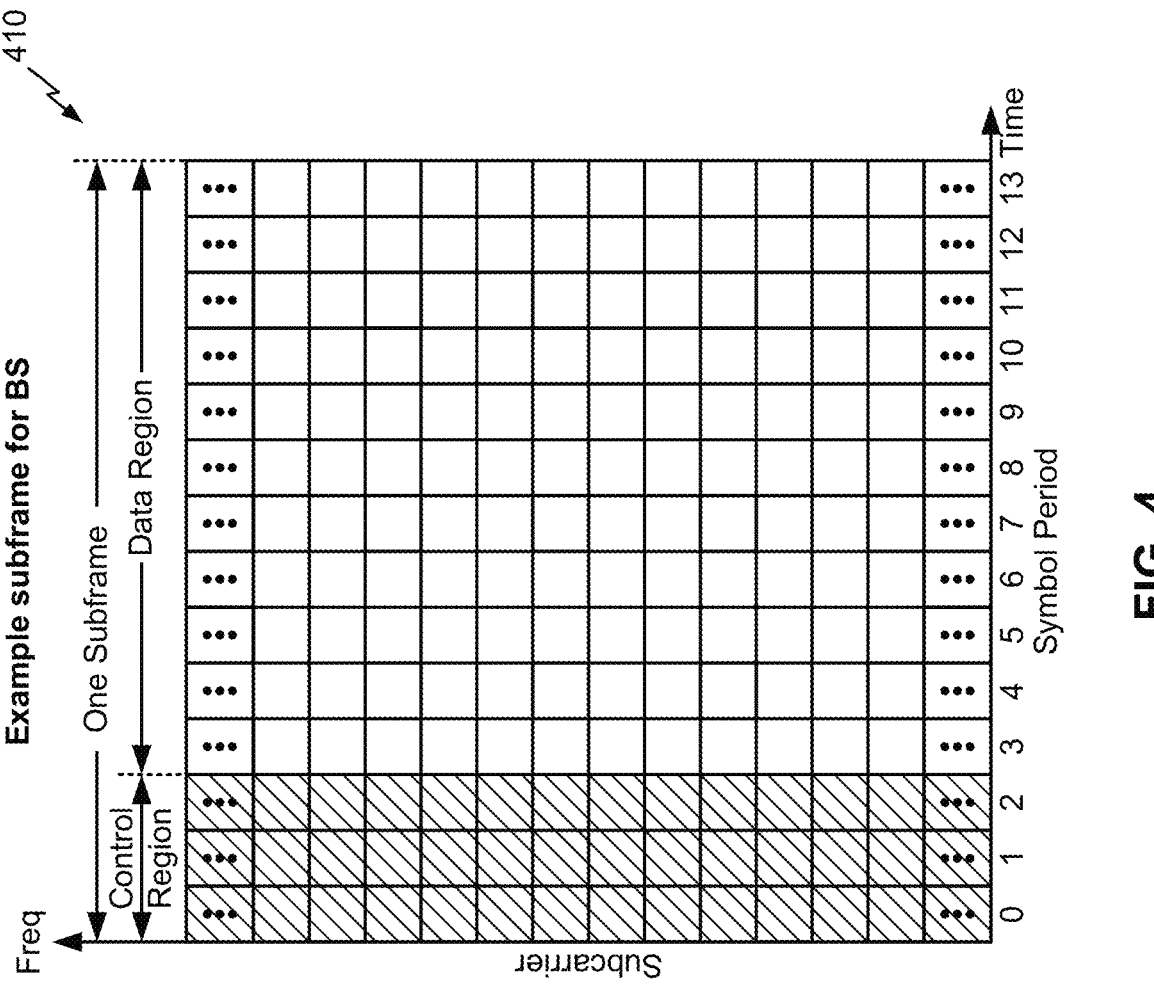
FIG. 4 is a block diagram conceptually illustrating an example subframe format with a normal cyclic prefix, in accordance with various aspects of the present disclosure.

FIG. 4 shows an example subframe format 410 with a normal cyclic prefix in accordance with various aspects of the present disclosure. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
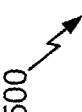
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
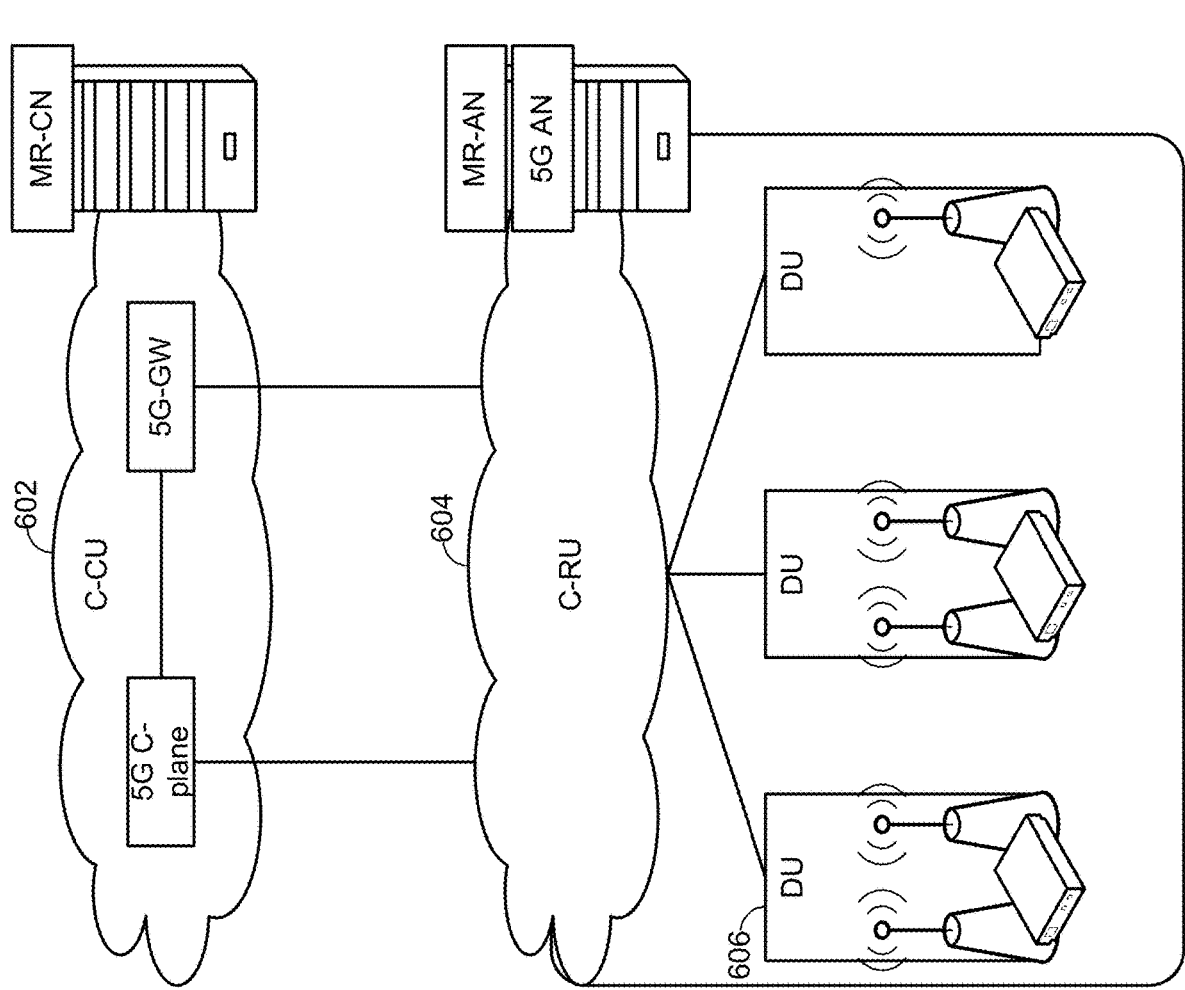
FIG. 6 illustrates an example physical architecture of a distributed RAN, in accordance with various aspects of the present disclosure.
Figure 6:
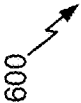

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7A:
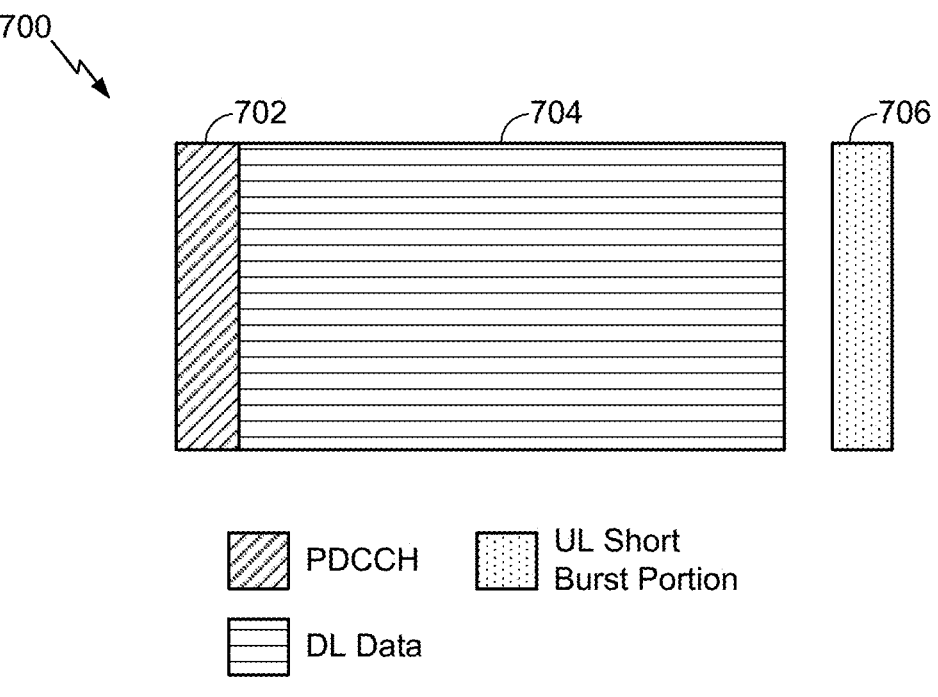
FIG. 7A is a diagram illustrating an example of a downlink (DL)-centric wireless communication structure in accordance with various aspects of the present disclosure.

FIG. 7A is a diagram 700 showing an example of a DL-centric wireless communication structure in accordance with various aspects of the present disclosure. The DL-centric wireless communication structure (referred to here-inafter as a DL-centric slot) may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7A.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/ or various other suitable types of information. The UL short burst portion 706 may include additional or alternative information, such as information pertaining to random access channel (RACH) procedures, scheduling requests, and various other suitable types of information.

As illustrated in FIG. 7A, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

Figure 7B:
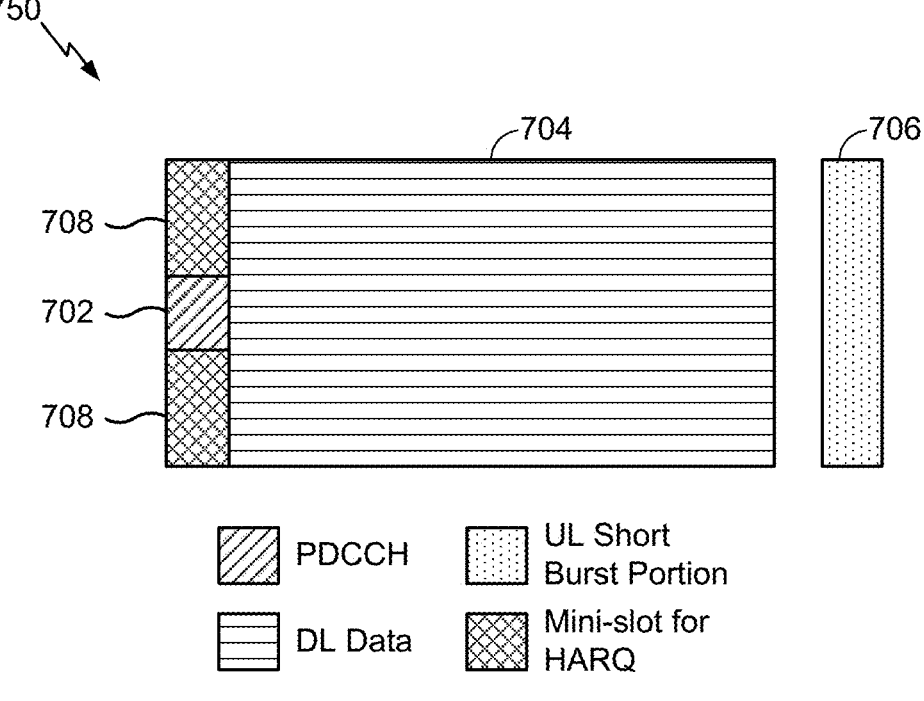
FIG. 7B is a diagram illustrating an example of a downlink (DL)-centric wireless communication structure that includes one or more mini-slots within a downlink common burst portion of the wireless communication structure.

In some aspects, the DL-centric slot may include one or more mini-slots in, for example, the control portion 702. FIG. 7B is a diagram 750 illustrating an example of a DL-centric slot that includes one or more mini-slots 708 within the control portion 702 (sometimes referred to as a DL common burst portion 702) of the DL-centric slot.

The mini-slot 708 is a unit of scheduling in NR that is smaller than a slot (i.e., a portion of the slot). For example, while an enhanced mobile broadband (eMBB) slot may include 14 symbols, the mini-slot 708 may include fewer than 14 symbols (e.g., one symbol, two symbols, four symbols, and/or the like). In some aspects, the mini-slot 708 may include one or more data symbols that represent data.

Additionally, or alternatively, the mini-slot 708 may include one or more control symbols that represent control information associated with the mini-slot 708. In some aspects, the one or more control symbols may be at or near a beginning of the mini-slot 708 (e.g., in the first two symbols of the mini-slot) or at or near an end of the mini-slot 708 (e.g., in the last symbol of the mini-slot.) Alternatively, the mini-slot 708 may not include a control symbol.

Additionally, or alternatively, the mini-slot 708 may include a reference symbol that carries information associated with demodulating data included in the mini-slot 708 (e.g., a DMRS). In some aspects, the reference symbol may be at any location within the mini-slot 708 (e.g., in a first symbol, a last symbol, and/or the like). In some aspects, the reference symbol and the control symbol may be the same symbol (i.e., a single symbol may carry the control information and the information associated with demodulating data included in the mini-slot 708).

In some aspects, the inclusion of the reference symbol in the mini-slot 708 may permit a reference symbol to be omitted from a portion of the DL data portion 704. For example, assume that the mini-slot 708 carries first data destined for a particular UE and the portion of the DL data portion 704, that uses a same frequency band as the mini-slot 708, carries second data destined for the particular UE. Here, if the mini-slot 708 includes the reference symbol, then the portion of the DL data portion 704 may not include the reference symbol. In this example, the particular UE may use the reference symbol included in the mini-slot 708 to demodulate the second data carried in the portion of the DL data portion 704. Omitting the reference symbol from the portion of the DL data portion 704 may provide for reduced latency since the particular UE may demodulate, and there-after acknowledge, receipt of the second data without buff-ering the second data carried in the portion of the DL data portion 704.

Alternatively, the mini-slot 708 may not include a reference symbol. For example, assume that the mini-slot 708 carries first data destined for a particular UE, and a portion of the DL data portion 704 that uses a same frequency band as the mini-slot 708 carries second data destined for the particular UE. Here, the mini-slot 708 may not include the reference symbol when the reference symbol is included in the portion of the DL data portion 704 that carries the second data. In this example, the particular UE may buffer the first data carried in the mini-slot 708, and demodulate the first data after receiving the reference symbol in the portion of the DL data portion 704. Omitting the reference symbol from the mini-slot 708 may provide for improved robustness to mobility of the particular UE since the reference symbol is received later (e.g., near the middle) of the transmission of the first data and the second data to the particular UE.

In some aspects, the mini-slot 708 may have a subcarrier spacing that is the same as a subcarrier spacing of the slot in which the mini-slot 708 is included. Alternatively, the mini-slot 708 may have a subcarrier spacing that differs from the subcarrier spacing of the slot in which the mini-slot 708 is included. In some aspects, increasing the subcarrier spacing of the mini-slot 708 relative to the subcarrier spacing of the slot may allow for additional symbols to be included in the mini-slot 708. For example, if the mini-slot 708 has a same subcarrier spacing as the slot (e.g., 30 kilohertz (kHz)), then the mini-slot 708 may include a particular number of symbols (e.g., 2 symbols). However, if the mini-slot 708 has a subcarrier spacing that is greater than (e.g., two times) the subcarrier spacing (e.g., 2×30 kHz=60 kHz), then the mini-slot 708 may include a greater number (e.g., two times) the particular number of symbols (e.g., 2×2 symbols=4 symbols).

In some aspects, a parameter, associated with transmitting data in the mini-slot 708, may be different than a parameter associated with transmitting data in the DL data portion 704. For example, a MCS associated with data included in the mini-slot 708 (e.g., a modulation order, a coding rate, a HARQ configuration, and/or the like) may be different from a MCS associated with data included in the DL data portion 704. As another example, a number of MIMO layers, associated with the data included in the mini-slot 708, may be different from a number of MIMO layers associated with the data included in the DL data portion 704.

As shown in FIG. 7B, in some aspects, a mini-slot 708 may be included in the control portion 702 (e.g., the DL common burst portion 702) of the DL-centric slot. In some aspects, the mini-slot 708 may be used to transmit data to a particular UE. As such, in some aspects, the mini-slot 708 may include hybrid automatic repeat request (HARQ) data (e.g., data associated with a HARQ transmission, like a retransmission, of a HARQ process), while the remainder of the control portion 702 may not include HARQ data.

In some aspects, the mini-slot 708 may be associated with transmitting data to a particular UE and may utilize one or more ranges of frequencies. For example, the mini-slot 708 may utilize a particular range of frequencies of the slot (e.g., a highest 30 megahertz (MHz) when a slot has a range of 80 MHz) to transmit data to the particular UE, while the DL common burst portion 702 may utilize a different range of frequencies of the slot (e.g., the remaining 50 MHz of the 80 MHz slot) to transmit control information to multiple UEs. As another example, the mini-slot 708 may utilize a first range of frequencies of the slot (e.g., the highest 30 MHz of the 80 MHz slot range) and a second range of frequencies of the slot (e.g., a lowest 30 MHz of the 80 MHz slot range) to transmit data to the particular UE, while the DL common burst portion 702 may utilize a third range of frequencies of the slot (e.g., a middle 20 MHz of the 80 MHz slot) to transmit control information to multiple UEs. In some aspects, as shown in FIG. 7B, the first range of frequencies may be separated from the second range of frequencies by the third range of frequencies.

Additionally, or alternatively, different mini-slots 708 may be associated with transmitting data to different UEs and may utilize different ranges of frequencies. For example, a first mini-slot 708 may utilize a first range of frequencies of the slot (e.g., the highest 30 MHz of the 80 MHz slot range) to transmit first data to a first particular UE, while a second mini-slot 708 may utilize a second range of frequencies of the slot (e.g., the lowest 30 MHz of the 80 MHz slot range) to transmit second data to a second particular UE. Here, the DL common burst portion 702 may utilize a third range of frequencies of the slot (e.g., the middle 20 MHz of the 80 MHz slot) to transmit control information to multiple UEs.

The foregoing is merely one example of a DL-centric wireless communication structure that includes one or more mini-slots and alternative structures having similar features may exist without necessarily deviating from the aspects described herein. Details regarding scheduling of mini-slots 708 within a DL-centric slot for transmission of HARQ data to a UE are described below.

As indicated above, FIGS. 7A and 7B are provided merely as examples. Other examples are possible and may differ from what was described with regard to FIGS. 7A and 7B. Further, while FIGS. 7A and 7B relate to DL-centric slots that may be used for NR technology, another type of radio access technology (e.g., LTE) may use a subframe for a similar purpose and/or in a similar manner as that described in association with the DL-centric slots of FIGS. 7A and 7B.

Figure 8A:
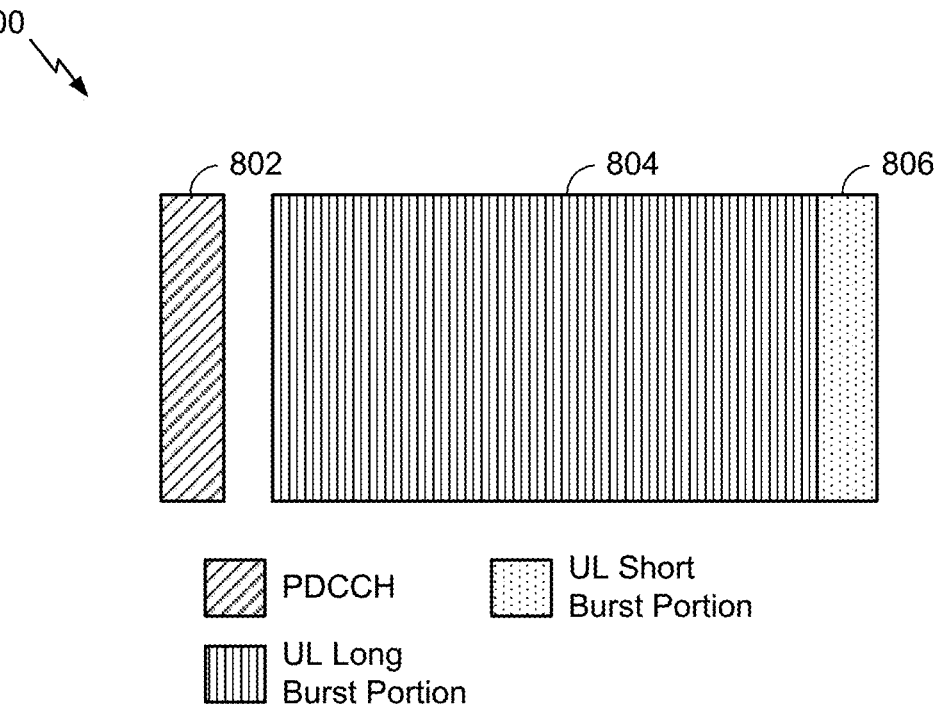
FIG. 8A is a diagram illustrating an example of an uplink (UL)-centric wireless communication structure in accordance with various aspects of the present disclosure.

FIG. 8A is a diagram 800 showing an example of an UL-centric wireless communication structure in accordance with various aspects of the present disclosure. The UL-centric wireless communication structure (referred to hereinafter as an UL-centric slot) may include a control portion 802. The control portion 802 may exist in the initial or beginning portion of the UL-centric slot. The control portion 802 in FIG. 8A may be similar to the control portion 702 described above with reference to FIG. 7A. In some configurations, the control portion 802 (sometimes referred to as DL common burst portion 802) may be a physical DL control channel (PDCCH).

The UL-centric slot may also include an UL long burst portion 804. The UL long burst portion 804 may sometimes be referred to as the payload of the UL-centric slot. The UL long burst portion 804 may refer to the communication resources utilized to communicate UL data from the subordinate entity (e.g., UE) to the scheduling entity (e.g., UE or BS).

As illustrated in FIG. 8A, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8A may be similar to the UL short burst portion 706 described above with reference to FIG. 7A, and may include any of the information described above in connection with FIG. 7A. The foregoing is merely one example of an UL-centric wireless communication structure and alternative structures having similar features may exist without necessarily deviating from the aspects described herein.

Figure 8B:
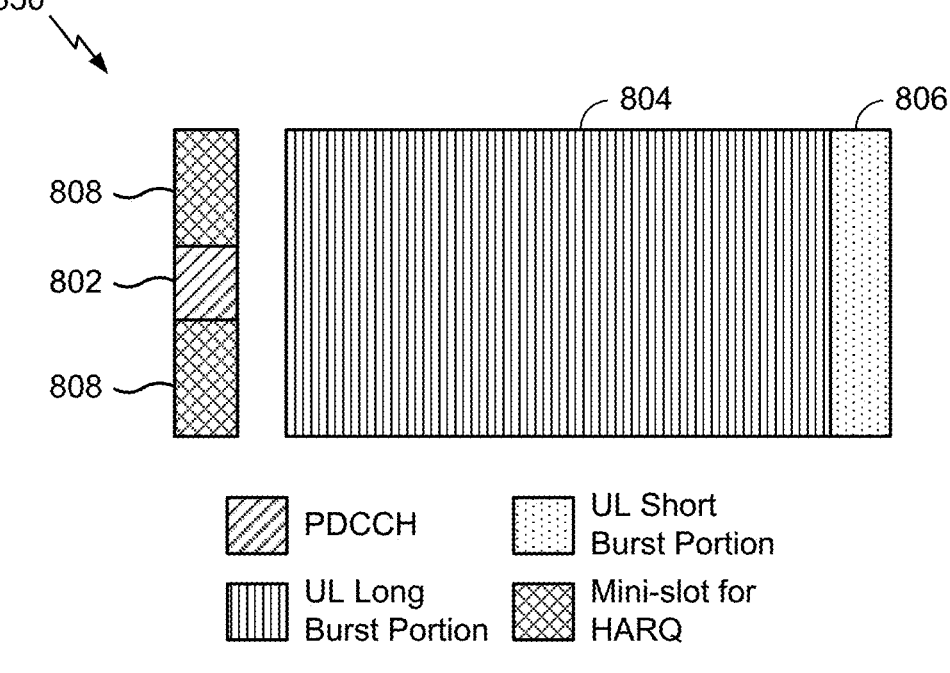
FIG. 8B is a diagram illustrating an example of an uplink (UL)-centric wireless communication structure that that includes one or more mini-slots within a downlink common burst portion of the wireless communication structure.

In some aspects, the UL-centric slot may include one or more mini-slots in, for example, the control portion 802. FIG. 8B is a diagram 850 illustrating an example of a UL-centric slot that includes one or more mini-slots 808 within the control portion 802 (sometimes referred to as a DL common burst portion 802) of the UL-centric slot. The mini-slot 808 in FIG. 8B may be similar to the mini-slot 708 described above with reference to FIG. 7B, and may include any information described in connection with FIG. 7B. The foregoing is merely one example of an UL-centric wireless communication structure that includes one or more mini-slots, and alternative structures having similar features may exist without necessarily deviating from the aspects described herein. Details regarding scheduling of mini-slots 808 within a UL-centric slot for transmission of HARQ data to a UE are described below.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, vehicle-to-everything (V2X) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIGS. 8A and 8B are provided merely as examples. Other examples are possible and may differ from what was described with regard to FIGS. 8A and 8B. Further, while FIGS. 8A and 8B relate to UL-centric slots that may be used for NR technology, another type of radio access technology (e.g., LTE) may use a subframe for a similar purpose and/or in a similar manner as that described in association with the UL-centric slots of FIGS. 8A and 8B.

As described above, a control portion of a slot (e.g., control portion 702 or control portion 802 of a DL-centric slot or an UL-centric slot, respectively) may include one or more mini-slots (e.g., mini-slots 708 or 808) for transmitting data (e.g., HARQ data associated with a HARQ process) to a UE. Use of the mini-slots within the control portion to transmit such data may permit a latency and/or a reliability requirement or threshold of a service (e.g., a low latency service, an ultra-reliable low-latency communication (URLLC) service, and/or the like) to be satisfied without impacting network performance. For example, when the control portion of the slot utilizes only a portion of the control portion (e.g., a middle 20 MHz of an 80 MHz range), use of one or more other portions of the control portion as mini-slots to transmit HARQ data of a HARQ process to UE 120 may improve the URLLC service, as provided to UE 120, by allowing for reduced latency and/or improved reliability (without negatively impacting network performance). In some aspects, BS 110 may schedule such mini-slots for transmissions of HARQ data within DL-centric and/or UL-centric slots.

In some aspects, the mini-slots may be used for a service that requires (e.g., due to a HARQ configuration of the UE 120) an acknowledgement (e.g., an ACK) or a non-acknowledgement (e.g., a NACK) to be transmitted in a same slot or a same mini-slot as a HARQ transmission. Here, BS 110 may schedule a mini-slot for a HARQ transmission to UE 120 (e.g., UE 120 with the HARQ configuration) in order to allow UE 120 to provide an acknowledgment or a non-acknowledgement in the same slot or the same mini-slot. In some aspects, BS 110 can schedule HARQ transmissions on the data portion of the slot, but a service requiring the same-slot acknowledgment or the same-slot non-acknowledgement may involve scheduling on the mini-slot depending on HARQ configurations supported by UE 120. For example, if UE 120 does not support transmitting a same-slot acknowledgement for data received in the data portion of the slot, but is capable of doing so for the mini-slot, then BS 110 may schedule the HARQ transmission using the mini-slot.

Figure 9:
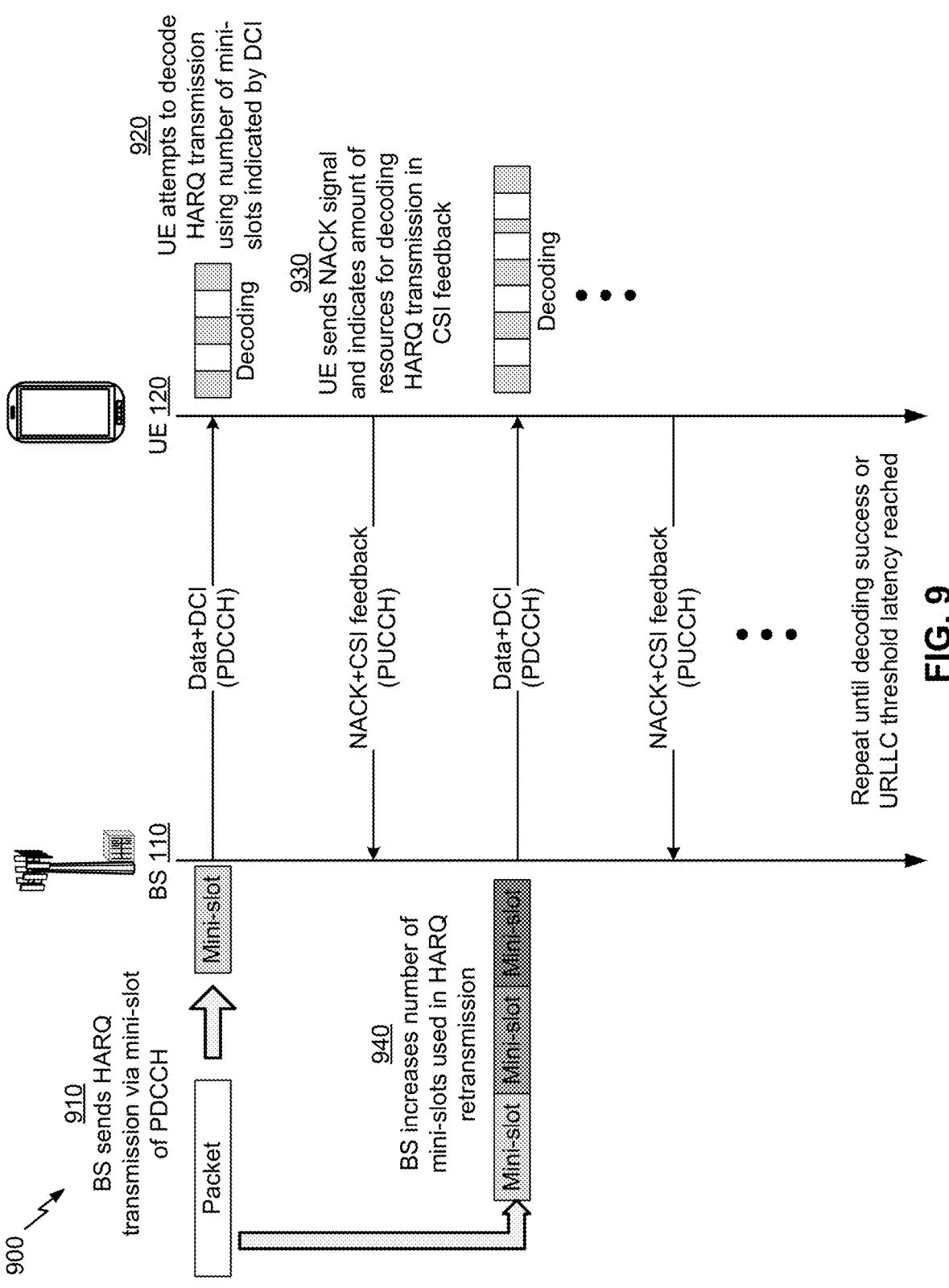
FIG. 9 is a diagram illustrating an example of using mini-slots for hybrid automatic repeat request (HARQ) transmissions, in accordance with various aspects of the present disclosure.

FIG. 9 is a diagram illustrating an example 900 of using mini-slots for HARQ transmissions, in accordance with various aspects of the present disclosure. As shown in FIG. 9, BS 110 transmits or sends a HARQ transmission to UE 120 using one or more mini-slots, and the UE 120 decodes the HARQ transmission based at least in part on the one or more mini-slots.

A HARQ process allows multiple transmissions (e.g., including an initial transmission and one or more retransmissions) to enable a UE (e.g., UE 120) to decode a received packet of the transmissions. Accordingly, a HARQ process enables a certain data rate without perfect link adaptation. URLLC requires low latency, thus allowing for a limited number of HARQ transmissions of a HARQ process to send a packet before the threshold latency (e.g., 500 microseconds (μs)) is reached and the packet expires or is dropped (e.g., due to not reaching the URLLC standard). On the other hand, URLLC requires ultra reliability (e.g., $10e^{-5}$), which can contradict low latency aspirations. In accordance with various aspects of this disclosure, mini-slot bundles may be used for HARQ transmissions to improve reliability of the HARQ process within a latency threshold (e.g., the latency threshold of URLLC). Accordingly, packet loss or drops may be avoided while maintaining low latency, resulting in conservation of resources by avoiding a need to resend dropped packets, avoiding the need to address failures due to packet loss, and/or the like.

As described herein, a HARQ process may include a plurality of HARQ transmissions from a BS. A HARQ transmission, as used herein, may refer to an initial HARQ transmission of a HARQ process and/or one or more HARQ retransmissions (e.g., one or more subsequent transmissions, of the HARQ process, that are transmitted after the initial HARQ transmission) of the HARQ process. A HARQ process may include a corresponding number of responses (e.g., ACK/NACK signals) to the BS from a UE. As used herein, a round of a HARQ process includes a HARQ transmission and a corresponding response (e.g., an ACK/NACK signal). Accordingly, each round of a HARQ process may begin with a HARQ transmission. As such, for one round of a HARQ process to send a packet, a BS may send a HARQ transmission and receive an ACK/NACK signal from a UE and the UE may receive the HARQ transmission and transmit the ACK/NACK to the BS.

As shown in example 900 of FIG. 9, BS 110 and UE 120 are engaged in a HARQ process to transmit a packet. As shown by reference number 910, BS 110 sends a HARQ transmission via a mini-slot of the PDCCH. Although only a single mini-slot is shown in example 900 with respect to reference number 910, in some aspects, a plurality of mini-slots may be used in the HARQ transmission (e.g., an initial HARQ transmission of a HARQ process) referenced in connection with reference number 910. As shown in FIG. 9, both data (e.g., a coded packet corresponding to the packet) and downlink control information (DCI) are transmitted in the HARQ transmission. The DCI may include an indicator that indicates a number of mini-slots to be bundled for the HARQ transmission. According to some implementations, a size of the DCI or when the DCI is transmitted (e.g., and consequently when the DCI is received) may be based at least in part on signaling, such as RRC signaling or Layer 1 signaling). In aspects, the signaling is dynamic signaling. For example, a size (or format) of the DCI, for each HARQ transmission of a HARQ process, may be predetermined (e.g., via a standard or specification of the BS 110 or UE 120) through the RRC signaling or the dynamic Layer 1 signaling.

As further shown in FIG. 9, and by reference number 920, UE 120 attempts to decode the HARQ transmission using the number of mini-slots indicated by the DCI. When decoding is unsuccessful, UE 120 may determine an amount of resources needed for decoding the HARQ transmission. For example, UE 120 may calculate an accumulated capacity based at least in part on a SINR of the HARQ transmission and determine a difference between the accumulated capacity and a target capacity of the HARQ transmission. In some aspects, the amount of the resources may be determined based at least in part on a remaining latency period of a threshold latency (e.g., a URLLC threshold latency, such as 500 μs) associated with the HARQ process. For example, if a relatively lower percentage of the threshold latency is remaining (e.g., which may indicate there is only time for one last HARQ retransmission of the HARQ process), then a relatively greater amount of resources may be determined to be needed (e.g., to meet the ultra-reliability goal of the HARQ process) to decode the HARQ transmission (or a subsequent HARQ transmission). By contrast, if a relatively greater percentage of the threshold latency is remaining (e.g., which may indicate there is time for more than one HARQ retransmission of the HARQ process, if needed) then a relatively lower amount of resources may be determined to be needed to decode the HARQ transmission (or a subsequent HARQ transmission).

As further shown in FIG. 9, and by reference 930, UE 120 sends a NACK signal (e.g., due to unsuccessful decoding of the HARQ transmission) and, in aspects, may indicate the amount of resources for decoding the HARQ transmission in CSI feedback. As such, the CSI feedback may be sent with the NACK signal. In some aspects, UE 120 may use quantization mapping in sending the NACK signal and/or CSI feedback to indicate the CSI feedback. Furthermore, in some aspects, a size of the CSI feedback may be based on and/or correspond to an amount of available uplink resources (e.g., on the PUCCH). In some aspects, when decoding is successful, UE 120 may respond to BS 110 with a positive acknowledgement like an ACK signal (rather than a negative acknowledgement like a NACK signal), indicating that the HARQ transmission was successfully decoded.

As further shown in FIG. 9, and by reference number 940, BS 110 may increase a number of mini-slots used in a HARQ retransmission of the HARQ process. In some aspects, BS 110 may increase the number of mini-slots (e.g., from one mini-slot to three mini-slots) used in the HARQ transmission based at least in part on the amount of resources indicated in the CSI feedback. In some aspects, the number of mini-slots may be increased based at least in part on a round of the HARQ process in which the HARQ retransmission is being transmitted. For example, for earlier rounds of a HARQ process (e.g., a first round or a second round), BS 110 may use a relatively lower number of mini-slots for the corresponding HARQ transmission (because there are relatively more opportunities available to get the packet decoded in subsequent HARQ retransmissions). Furthermore, for later rounds (e.g., a third round, a fourth round, and/or a later round) of the HARQ process, BS 110 may use a relatively higher number of mini-slots for the corresponding HARQ transmission (e.g., because there are relatively fewer opportunities available to get the packet decoded in subsequent HARQ retransmissions). In some aspects, BS 110 may increase the number of mini-slots for the HARQ retransmission in order to decrease a target block error rate (BLER) of the HARQ retransmission relative to the previous HARQ transmission. In some aspects, each round of a HARQ process may be associated with a particular target (BLER). For example, a first round of a HARQ process may target a BLER of $10^{-1}$, while a second round of a HARQ process may target a BLER of $10^{-4}$, and so on.

According to some aspects, after BS 110 increases the number of mini-slots for the HARQ retransmission, BS 110 may send the HARQ retransmission and the HARQ process repeats until there is a successful decoding or until the URLLC threshold latency is reached (e.g., the packet is expired or dropped). In some aspects, the number of mini-slots for a HARQ transmission may be based at least in part on an amount of available resources for the HARQ transmission (e.g., the lower the amount of available resources for the HARQ transmission, the lower the number of mini-slots (and vice versa)).

In some aspects, the three mini-slots shown in the example of FIG. 9 may each include the same packet of the HARQ transmission. Accordingly, the same packet may be transmitted multiple times in a single HARQ transmission. In some aspects, additionally or alternatively, two or more of the mini-slots may include a different portion of the same packet. For example, BS 110 may use longer length coding to divide and map the packet across two or more of the mini-slots. Furthermore, in some aspects, at least two of the mini-slots may be associated with at least one of a different resource block (RB) allocation, a different redundancy version (RV), or a different modulation coding scheme (MCS) (e.g., a different modulation scheme and coding scheme combination). For example, the RB allocation, RV, and/or MCS may be configurable according to a standard, according to a specific setting, according to capabilities of BS 110 and/or UE 120, and/or the like. According to some examples, an MCS mapping is included within the HARQ transmissions to facilitate the mini-slot bundling.

As indicated above, FIG. 9 is provided as an example. Other examples are possible and may differ from what was described with respect to FIG. 9.

Figure 10A:
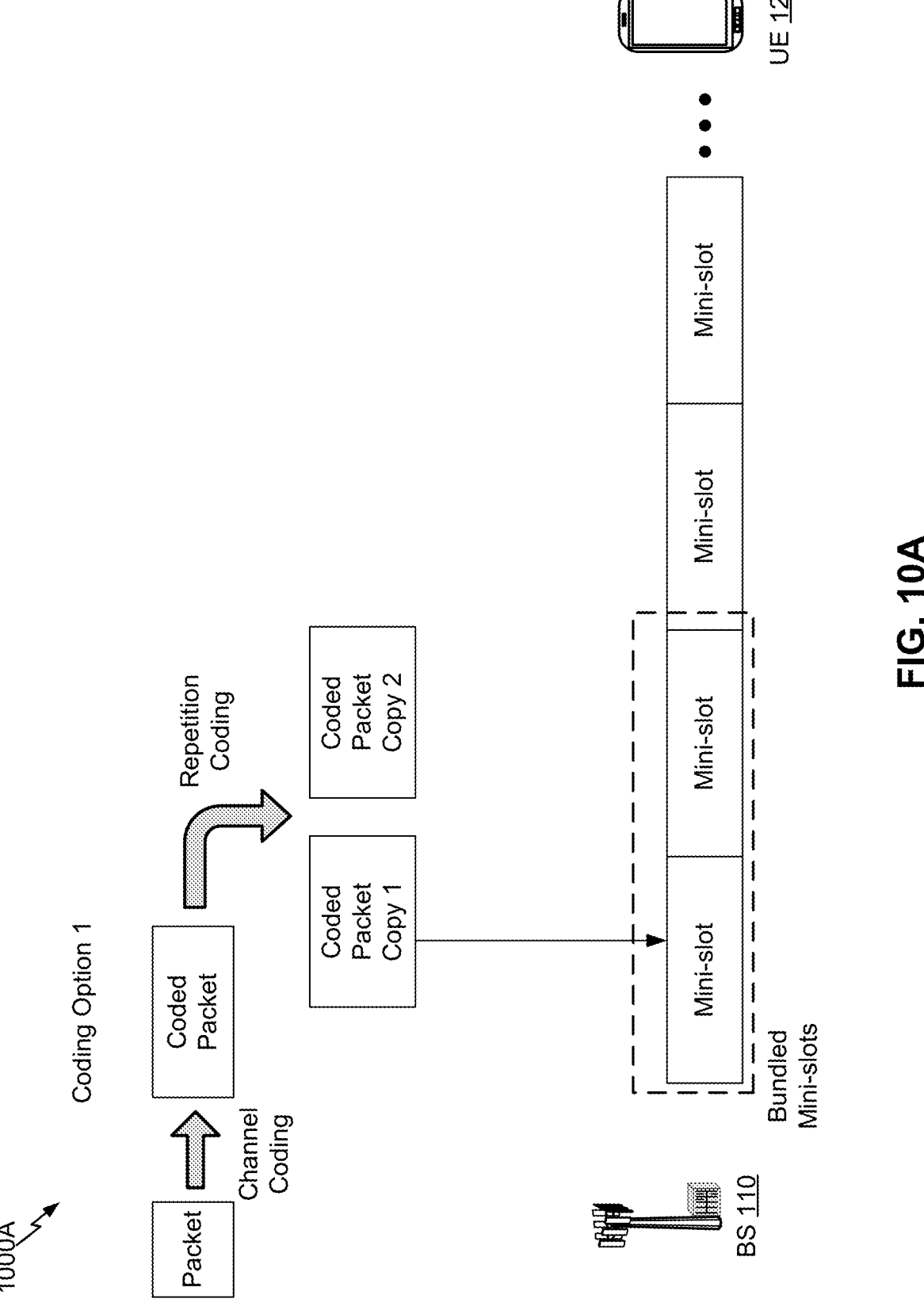
FIGS. 10A and 10B are diagrams illustrating examples of coding used with mini-slots for HARQ transmissions, in accordance with various aspects of the present disclosure.
Figure 10B:
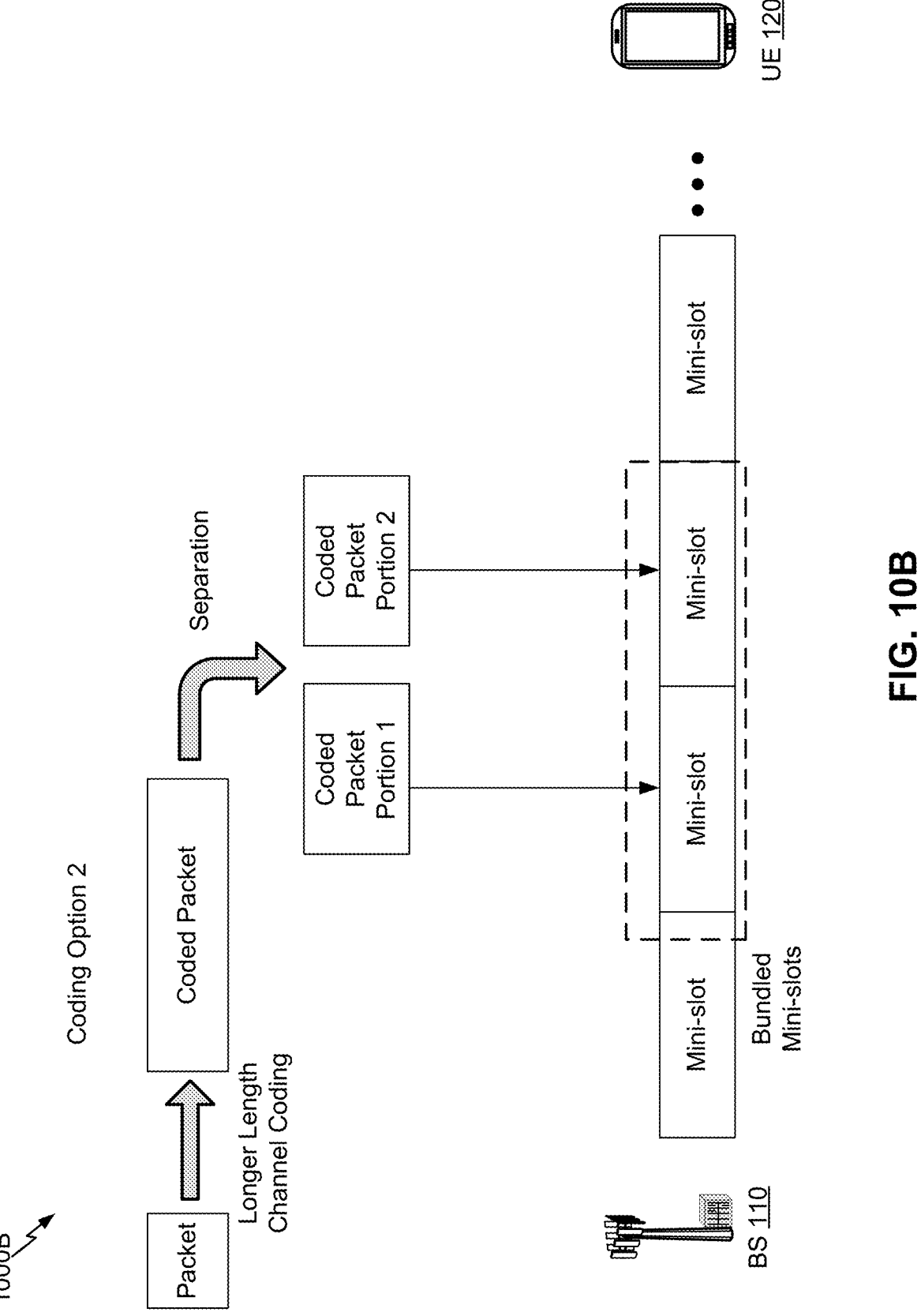

FIGS. 10A and 10B are diagrams illustrating examples 1000A and 1000B of coding mini-slots for HARQ transmissions, in accordance with various aspects of the present disclosure. According to some aspects, BS 110 may use coding of examples 1000A and/or 1000B to code packets of HARQ transmissions of a HARQ process. In FIGS. 10A and 10B, a sequence of mini-slots is shown between BS 110 and UE 120 that includes a mini-slot bundle used for a HARQ transmission of a HARQ process.

As shown in example 1000A of FIG. 10A, Coding Option 1 includes creating a coded packet using channel coding and performing repetition coding to create copies of the coded packet. As shown in FIG. 10A, BS 110 assigns separate copies of the coded packet to separate mini-slots that are bundled for a HARQ transmission. In some aspects, BS 110 may configure each of the mini-slots to be associated with at least one of a different resource block allocation, a different redundancy version, or a different modulation coding scheme. As such, in each HARQ transmission, BS 110 may send multiple copies of a packet to UE 120 (e.g., to increase probability of meeting ultra reliability of URLLC). In such cases, UE 120 may use a Chase combining scheme to decode the HARQ transmission. In some instances, when repetition coding is used as shown in example 1000A, UE 120 may use incremental redundancy when the mini-slots have different respective RVs.

As shown in example 1000B of FIG. 10B, Coding Option 2 includes creating a coding packet using longer length channel coding and performing separation to divide and map a first portion of the coded packet (coded packet portion 1) and a second portion of the coded packet (coded packet portion 2). As shown in FIG. 10B, BS 110 assigns the portions of the coded packet to separate mini-slots that are bundled for a HARQ transmission. As such, in each HARQ transmission, BS 110 may send a relatively large (or long) packet using multiple mini-slots to UE 120 (e.g., to increase a probability of meeting ultra reliability and/or low latency of URLLC). In such cases, UE 120 may use incremental redundancy to decode the HARQ transmission.

As indicated above, FIGS. 10A and 10B are provided as examples. Other examples are possible and may differ from and/or combine what was described with respect to FIGS. 10A and 10B.

Figure 11A:
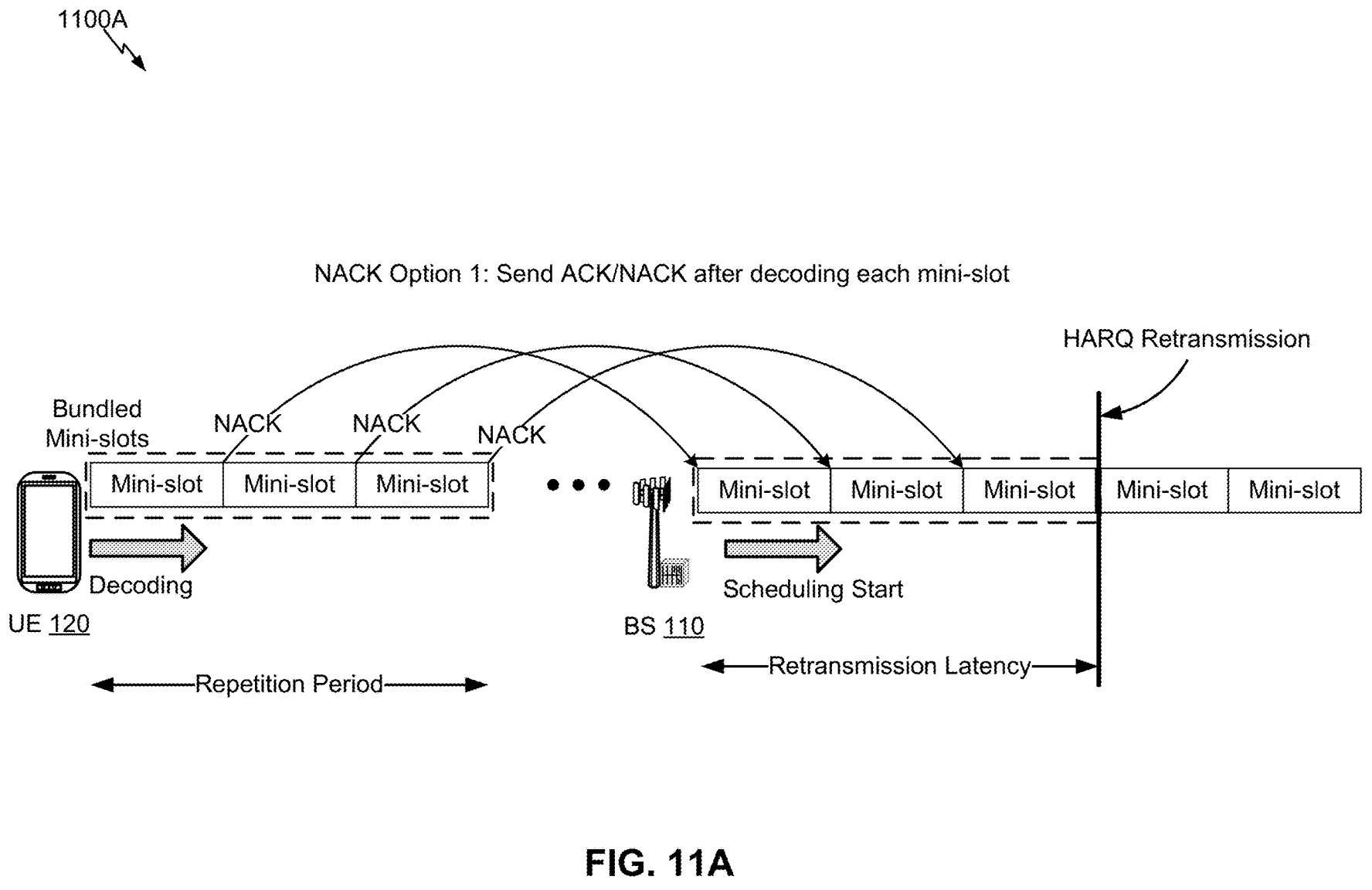
Figure 11B:
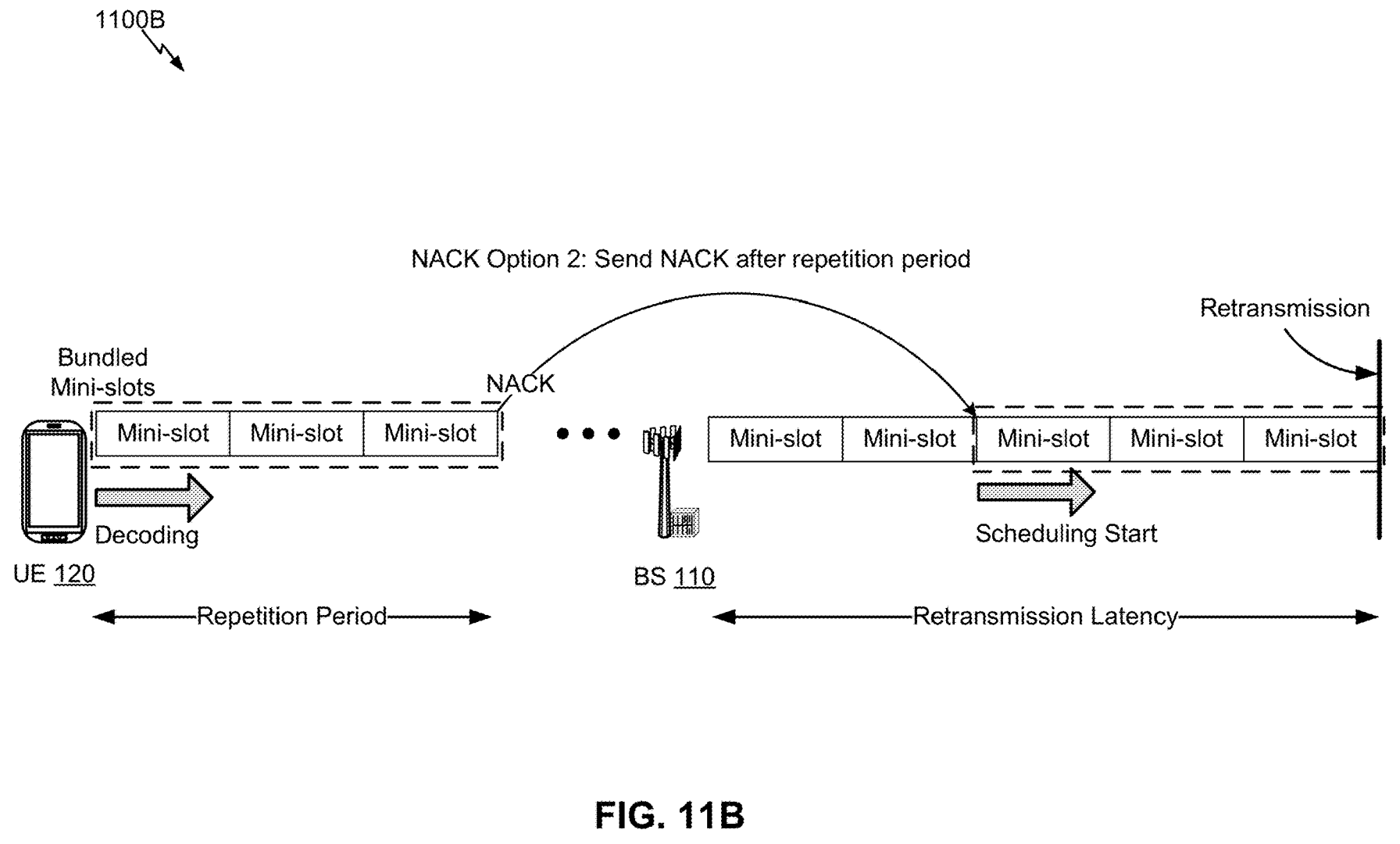

FIGS. 11A and 11B are diagrams illustrating examples 1100A and 1100B of coding mini-slots for HARQ transmissions, in accordance with various aspects of the present disclosure. According to some aspects, UE 120 may use ACK and/or NACK (e.g., NACK shown in FIGS. 11A and 11B) timing of examples 1100A and/or 1100B to send ACK and/or NACK (e.g., NACK) signals in response to HARQ transmissions of a HARQ process. In FIGS. 11A and 11B, a bundle of mini-slots is shown as being decoded by UE 120 and a corresponding latency is shown for BS 110 based at least in part on NACK timing used by UE 120. In some aspects, an ACK signal may be sent in place of one of the NACK signals as soon as a mini-slot is successfully decoded, which may then enable BS 110 to complete the HARQ process.

As shown in example 1100A of FIG. 11A, NACK Option 1 sends a respective NACK signal after receiving and/or decoding (e.g., unsuccessfully) each of the three mini-slots of a HARQ transmission. As such, BS 110 may receive the NACK signals after the mini-slots of the HARQ transmission are decoded. Accordingly, BS 110 may start scheduling a transmission once the first NACK signal is received (e.g., knowing that the remaining mini-slots of the bundled mini-slots are being decoded). As such, BS 110 may configure mini-slots for a HARQ retransmission while UE 120 is decoding mini-slots of a previous HARQ transmission, reducing a retransmission latency between the previous HARQ transmission and a HARQ retransmission. As shown, after receiving the three NACK signals (and, correspondingly, after UE 120 decodes the three mini-slots), BS 110 may send a subsequent HARQ retransmission of the HARQ process (as shown the retransmission latency corresponds to the number of mini-slots). In some aspects, if UE 120 successfully decodes one of the mini-slots of the HARQ transmission, UE 120 may send an ACK signal, indicating that BS 110 may send a next packet and/or initiate a subsequent HARQ process.

As shown in example 1100B of FIG. 11B, NACK Option 2 sends a NACK signal after a repetition period expires, thus conserving resources by sending fewer NACK signals than NACK Option 1 of example 1100A in FIG. 11A. As shown in FIG. 11B, the repetition period corresponds to the number of mini-slots of the bundled mini-slots. As such, the repetition period may be a length of time for UE 120 to decode the bundled mini-slots. Accordingly, BS 110 may not start scheduling a transmission until the expiration of the repetition period. As such, BS 110 may not configure mini-slots for a HARQ retransmission while UE 120 is decoding mini-slots of a previous HARQ transmission. As shown, after receiving the NACK signal (e.g., and, correspondingly, after UE 120 decodes the three mini-slots), BS 110 may begin scheduling mini-slots for a subsequent HARQ retransmission of the HARQ process (e.g., as shown, the retransmission latency corresponds to the number of mini-slots of the bundled mini-slots and the number of mini-slots of the subsequent HARQ retransmission). In some aspects, if UE 120 successfully decodes one of the mini-slots of the HARQ transmission, UE 120 may send an ACK signal, indicating that BS 110 may send a next packet and/or initiate a subsequent HARQ process.

While sending NACK signals after each mini-slot, as shown by example 1100A in FIG. 11A, may reduce retransmission latency to enable BS 110 to send a subsequent HARQ retransmission more quickly, frequently sending NACK signals may consume a greater amount of resources. On the other hand, as shown by example 1100B in FIG. 11B, sending a single NACK signal after the repetition time expires may conserve resources, but cause greater retransmission latency between HARQ transmissions of a HARQ process. Therefore, in some aspects, UE 120 may implement NACK Option 2 when a remaining latency period of a threshold latency (e.g., a URLLC latency) satisfies a threshold remaining latency period. For example, if a remaining threshold latency period indicates that there is time to send multiple HARQ transmissions (e.g., three or more) of a HARQ process, UE 120 may implement NACK Option 2 to conserve resources. Furthermore, in some aspects, UE 120 may implement NACK Option 1 of example 1100A when the remaining latency period of the threshold does not satisfy the threshold remaining latency period. For example, if the remaining threshold latency period indicates that there may only be time for one or two more HARQ retransmissions of a HARQ process, UE 120 may implement NACK Option 1 to decrease the retransmission latency.

As indicated above, FIGS. 11A and 11B are provided as examples. Other examples are possible and may differ from what was described with respect to FIGS. 11A and 11B.

Figure 12:
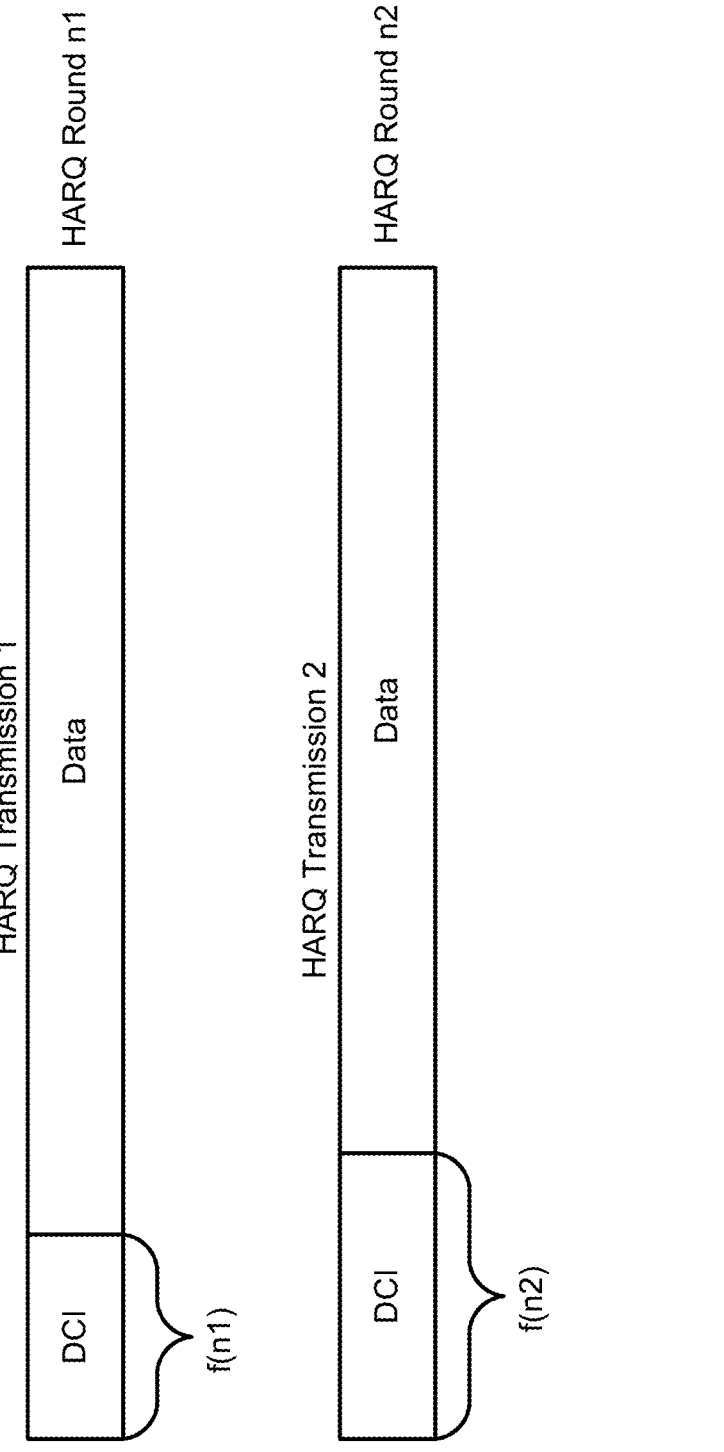
FIG. 12 is a diagram illustrating an example of downlink control information associated with HARQ transmissions using mini-slots, in accordance with various aspects of the present disclosure.

FIG. 12 is a diagram illustrating an example 1200 of DCI associated with HARQ transmissions using mini-slots, in accordance with various aspects of the present disclosure. In example 1200 of FIG. 12, data associated with two HARQ transmissions corresponding to two rounds n1, n2 of a HARQ process may follow DCI (e.g., which indicates a number of mini-slots to be bundled to decode the HARQ transmissions). As shown, a size of the DCI of the HARQ transmission of the first HARQ Round n1 is smaller than a size of the DCI of the HARQ transmission of the second HARQ Round n2. Accordingly, in some aspects, BS 110 may configure the size of the DCI (e.g., a size of the indicator indicating a number of mini-slots to be bundled for a HARQ transmission of the HARQ process) based on and/or to correspond to the round of the HARQ process of the HARQ transmission. In other words, the size of the DCI may be a function of the round of the HARQ process. For example, the later the round of the HARQ process, the greater the size of the DCI in the HARQ transmission (and vice versa). In some aspects, BS 110 may configure the size of the DCI to correspond to the number of mini-slots to be bundled for the HARQ transmission. In some aspects, BS 110 may configure the size of the DCI based at least in part on receiving an ACK or NACK signal from UE 120. As mentioned above, in some aspects, a size of the DCI or when the DCI is received may be based at least in part on RRC signaling or dynamic Layer 1 signaling.

As indicated above, FIG. 12 is provided as an example. Other examples are possible and may differ from what was described with respect to FIG. 12.

Figure 13:
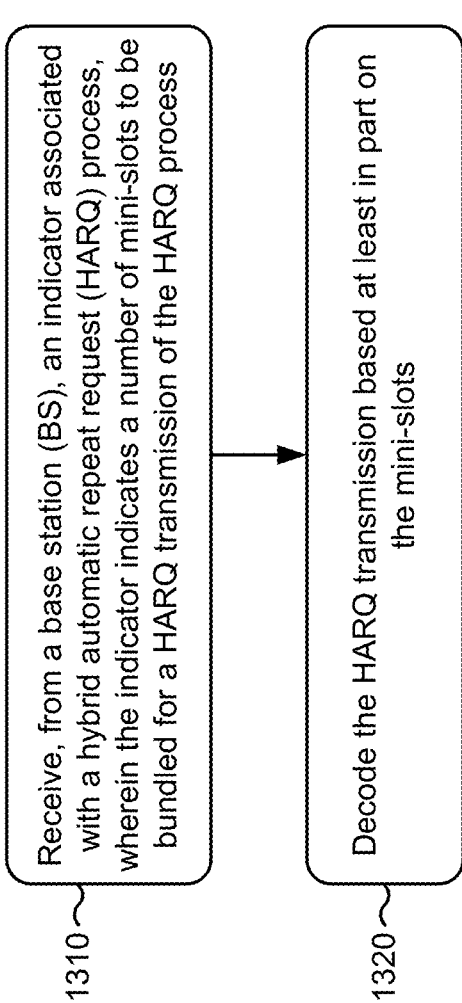
FIG. 13 is a diagram illustrating an example process performed, for example, by a user equipment, in accordance with various aspects of the present disclosure.

FIG. 13 is a diagram illustrating an example process 1300 performed, for example, by a UE, in accordance with various aspects of the present disclosure. Example process 1300 is an example where a UE (e.g., UE 120) performs decoding of a HARQ transmission based at least in part on a number of mini-slots of the HARQ transmission.

As shown in FIG. 13, in some aspects, process 1300 may include receiving, from a base station (BS), an indicator associated with a hybrid automatic repeat request (HARQ) process, wherein the indicator indicates a number of mini-slots to be bundled for a HARQ transmission of the HARQ process (block 1310). For example, the UE may receive an indicator, associated with a HARQ process, from a BS, such as BS 110. In some aspects, the indicator may indicate a number of mini-slots to be bundled for a HARQ transmission of the HARQ process, as described above.

As shown in FIG. 13, in some aspects, process 1300 may include decoding the HARQ transmission based at least in part on the mini-slots (block 1320). For example, the UE may decode the HARQ transmission based at least in part on one or more of the mini-slots, as described above.

Process 1300 may include additional aspects, such as any single aspect or any combination of aspects described below.

In some aspects, each of the mini-slots includes a same packet of the HARQ transmission. In some aspects, at least two of the mini-slots are associated with at least one of: a different resource block allocation, a different redundancy version, or a different modulation coding scheme (e.g., a different combination of modulation scheme and coding scheme). In some aspects, at least one of the number of the mini-slots or when the indicator is received is based at least in part on at least one of: a round of the HARQ process associated with the HARQ transmission a remaining latency period of a threshold latency associated with the HARQ process, an amount of available resource blocks for the HARQ transmission. In some aspects, two or more of the mini-slots include a different portion of a same packet of the HARQ transmission, wherein a longer length coding is used to divide and map the same packet across the two or more of the mini-slots.

In some aspects, the UE is configured to decode the HARQ transmission using a Chase combining scheme when two or more of the mini-slots includes a same packet of the HARQ transmission. In some aspects, the UE is configured to decode the HARQ transmission using incremental redundancy when two or more of the mini-slots includes a different portion of a packet of the HARQ transmission. In some aspects, the UE is configured to decode the HARQ transmission using incremental redundancy when two or more of the mini-slots includes a same packet of the HARQ transmission and different respective redundancy versions are used for the two or more of the mini-slots.

In some aspects, the UE is configured to send an acknowledgement or a non-acknowledgement response after a repetition period, corresponding to the number of the mini-slots of the HARQ transmission, expires. In some aspects, the UE is configured to send at least one of an acknowledgement or a non-acknowledgement response after receiving or decoding each respective one of the mini-slots of the HARQ transmission. In some aspects, the UE, based at least in part on a remaining latency period of a threshold latency associated with the HARQ process, is configured to: send an acknowledgement or a non-acknowledgement response after a repetition period, corresponding to the number of the mini-slots of the HARQ transmission, expires when the remaining latency period satisfies a threshold remaining latency period, or send an acknowledgement or non-acknowledgement response after receiving or decoding each respective one of the mini-slots of the HARQ transmission when the remaining latency period does not satisfy the threshold remaining latency period.

In some aspects, the indicator is included in downlink control information (DCI) associated with the HARQ process. In some aspects, the UE is configured to decode the mini-slots based at least in part on the number of the mini-slots indicated for the HARQ transmission. In some aspects, a size of downlink control information (DCI) is based at least in part on the number of the mini-slots, wherein the DCI is associated with the HARQ process and includes the indicator. In some aspects, a bit size of the indicator is based at least in part on a round of the HARQ transmission, wherein the round of the HARQ transmission is based at least in part on a number of HARQ transmissions that have occurred in the HARQ process. In some aspects, the UE is configured to reply to the HARQ transmission with an acknowledgement or a non-acknowledgement response, wherein a size of downlink control information (DCI) associated with a subsequent HARQ transmission of the HARQ process is increased based at least in part on the acknowledgement or the non-acknowledgement response. In some aspects, the indicator is received in downlink control information (DCI); and at least one of a size of the DCI or when the DCI is received is based at least in part on a radio resource control (RRC) signaling or dynamic Layer 1 signaling.

In some aspects, the UE is configured to provide, to the BS, channel state information (CSI) feedback indicating an amount of resources to decode the HARQ transmission. In some aspects, the UE is further configured to calculate accumulated capacity based at least in part on a signal to interference plus noise ratio (SINR) of the HARQ transmission, wherein the amount of resources is based at least in part on a difference between a target capacity of the HARQ transmission and the accumulated capacity. In some aspects, the UE is further configured to send, to the BS, the CSI feedback with a non-acknowledgement response to the HARQ transmission. In some aspects, the amount of resources is based at least in part on a remaining latency period of a threshold latency associated with the HARQ process. In some aspects, a size of the CSI feedback indicating the amount of resources is based at least in part on an amount of available uplink resources.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
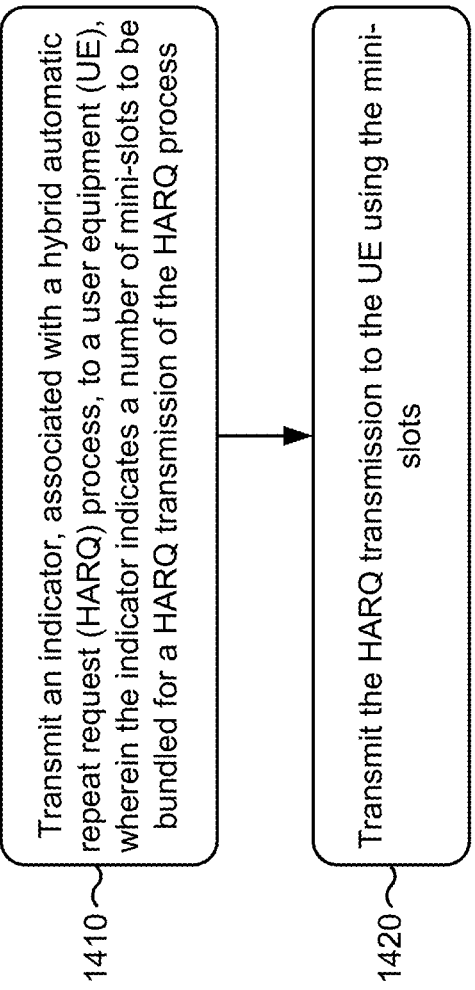
FIG. 14 is a diagram illustrating an example process performed, for example, by a base station, in accordance with various aspects of the present disclosure.

FIG. 14 is a diagram illustrating an example process 1400 performed, for example, by a BS, in accordance with various aspects of the present disclosure. Example process 1400 is an example where a BS (e.g., BS 110) transmits a HARQ transmission of a HARQ process using mini-slots.

As shown in FIG. 14, in some aspects, process 1400 may include transmitting an indicator, associated with a hybrid automatic repeat request (HARQ) process, to a user equipment (UE), wherein the indicator indicates a number of mini-slots to be bundled for a HARQ transmission of the HARQ process (block 1410). For example, the BS may transmit an indicator, associated with a HARQ process, to a UE, such as UE 120. In some aspects, the indicator may indicate a number of mini-slots to be bundled for a HARQ transmission of the HARQ process, as described above.

In some aspects, process 1400 may include transmitting the HARQ transmission to the UE using the mini-slots (block 1420). For example, the BS may transmit the HARQ transmission to the UE using the mini-slots, as described above.

Process 1400 may include additional aspects, such as any single aspect or any combination of aspects described below.

In some aspects, the BS is configured to configure each of the mini-slots to include a same packet of the HARQ transmission. In some aspects, the BS is configured to configure at least two of the mini-slots to have at least one of: a different resource block allocation, a different redundancy version; or a different modulation coding scheme (e.g., a different combination of modulation scheme and coding scheme). In some aspects, the BS is configured to determine at least one of the number of the mini-slots or when the indicator is to be transmitted based at least in part on at least one of: a round of the HARQ process associated with the HARQ transmission, a remaining latency period of a threshold latency associated with the HARQ process, or an amount of available resource blocks for the HARQ transmission. In some aspects, the BS is configured to configure two or more of the mini-slots to include a different portion of a same packet of the HARQ transmission, wherein the BS is configured to use a longer length coding to divide and map the same packet across the two or more of the mini-slots.

In some aspects, the HARQ transmission is to be decoded using a Chase combining scheme when two or more of the mini-slots include a same packet of the HARQ transmission. In some aspects, the HARQ transmission is to be decoded using incremental redundancy when two or more of the mini-slots include a different portion of a packet of the HARQ transmission. In some aspects, the HARQ transmission is to be decoded using incremental redundancy when two or more of the mini-slots includes a same packet of the HARQ transmission and different respective redundancy versions are used for the tow or more of the mini-slots.

In some aspects, the BS is configured to receive an acknowledgement or a non-acknowledgement response after a repetition period, corresponding to the number of the mini-slots of the HARQ transmission, expires. In some aspects, the BS is configured to receive at least one of an acknowledgement or a non-acknowledgement response after each respective one of the mini-slots of the HARQ transmission is received or decoded. In some aspects, the BS, based at least in part on a remaining latency period of a threshold latency associated with the HARQ process, is configured to: receive an acknowledgement or a non-acknowledgement response after a repetition period, corresponding to a number of the mini-slots of the HARQ transmission, expires when the remaining latency period satisfies a threshold remaining latency period, or receive an acknowledgement or a non-acknowledgement response after receiving or decoding each respective one of the mini-slots of the HARQ transmission when the remaining latency period does not satisfy the threshold remaining latency period.

In some aspects, the BS is configured to include the indicator within downlink control information (DCI) associated with the HARQ process. In some aspects, the mini-slots are to be decoded based at least in part on the number of the mini-slots indicated for the HARQ transmission. In some aspects, the BS is configured to configure a size of downlink control information (DCI) based at least in part on the number of the mini-slots, wherein the DCI is associated with the HARQ process and includes the indicator. In some aspects, the BS is configured to configure a bit size of the indicator based at least in part on a round of the HARQ transmission, wherein the round of the HARQ transmission is based at least in part on a number of HARQ transmissions that have occurred in the HARQ process. In some aspects, the BS is configured to: receive an acknowledgement or a non-acknowledgement response based at least in part on the HARQ transmission; and increase a size of downlink control information (DCI) associated with a subsequent HARQ transmission of the HARQ process based at least in part on the acknowledgement or the non-acknowledgement response. In some aspects, the indicator is transmitted in downlink control information (DCI); and at least one of a size of the DCI or when the DCI is received is based at least in part on a radio resource control (RRC) signaling or a dynamic Layer 1 signaling.

In some aspects, the BS is configured to receive channel state information (CSI) feedback indicating an amount of resources to be used to decode the HARQ transmission. In some aspects, the amount of resources is based at least in part on a difference between a target capacity of the HARQ transmission and an accumulated capacity calculated by the UE, wherein the accumulated capacity is calculated based at least in part on a signal to interference plus noise ratio (SINR) of the HARQ transmission. In some aspects, the BS is further configured to receive the CSI feedback with a non-acknowledgement response to the HARQ transmission. In some aspects, the amount of the resources is based at least in part on a remaining latency period of a threshold latency associated with the HARQ process. In some aspects, a size of the CSI feedback indicating the amount of resources is based at least in part on an amount of available uplink resources.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. An apparatus for wireless communication, comprising:
a memory; and
one or more processors operatively coupled to the memory, the memory and the one or more processors configured to:
receive layer 1 signaling comprising an indicator, the indicator indicating a number of mini-slots, wherein one or more of the mini-slots comprise a portion of a slot, the indicator is received in downlink control information (DCI), wherein a size of the DCI corresponds to the number of mini-slots;
receive copies of a packet in the number of mini-slots; and
transmit a hybrid automatic repeat request (HARQ) response based at least in part on receiving the copies of the packet.

2. The apparatus of claim 1, wherein the HARQ response comprises a HARQ acknowledgement (ACK) or a HARQ negative acknowledgement (NACK) corresponding to the packet.

3. The apparatus of claim 1, wherein the one or more processors, to receive the copies of the packet, are configured to:
receive each of the copies of the packet in a corresponding mini-slot of the number of mini-slots.

4. The apparatus of claim 1, wherein each mini-slot of the number of mini-slots corresponds to one or more of:
a different resource block allocation;
a different redundancy version; or
a different modulation and coding scheme.

5. The apparatus of claim 1, wherein the one or more processors, to receive the copies of the packet, are configured to:
decode the copies of the packet using a Chase combining scheme.

6. A method of wireless communication performed a user equipment (UE), comprising:
receiving layer 1 signaling comprising an indicator, the indicator indicating a number of mini-slots, wherein one or more of the mini-slots comprise a portion of a slot, the indicator is received in downlink control information (DCI), wherein a size of the DCI corresponds to the number of mini-slots;
receiving copies of a packet in the number of mini-slots; and
transmitting a hybrid automatic repeat request (HARQ) response based at least in part on receiving the copies of the packet.

7. The method of claim 6, wherein the HARQ response comprises a HARQ acknowledgement (ACK) or a HARQ negative acknowledgement (NACK) corresponding to the packet.

8. The method of claim 6, wherein receiving the copies of the packet further comprises:
receiving each of the copies of the packet in a corresponding mini-slot of the number of mini-slots.

9. The method of claim 6, wherein each mini-slot of the number of mini-slots corresponds to one or more of:
a different resource block allocation;
a different redundancy version; or
a different modulation and coding scheme.

10. The method of claim 6, wherein receiving the copies of the packet further comprises:
decoding the copies of the packet using a Chase combining scheme.

11. An apparatus for wireless communication, comprising:
a memory; and
one or more processors operatively coupled to the memory, the memory and the one or more processors configured to:
transmit layer 1 signaling comprising an indicator, the indicator indicating a number of mini-slots, wherein one or more of the mini-slots comprise a portion of a slot, the indicator is transmitted in downlink control information (DCI), wherein a size of the DCI corresponds to the number of mini-slots;
transmit copies of a packet in the number of mini-slots; and receive a hybrid automatic repeat request (HARQ) response based at least in part on receiving the copies of the packet.

12. The apparatus of claim 11, wherein the HARQ response comprises a HARQ acknowledgement (ACK) or a HARQ negative acknowledgement (NACK) corresponding to the packet.

13. The apparatus of claim 11, wherein the one or more processors, to transmit the copies of the packet, are configured to:

transmit each of the copies of the packet in a corresponding mini-slot of the number of mini-slots.

14. The apparatus of claim 11, wherein each mini-slot of the number of mini-slots corresponds to one or more of:

a different resource block allocation;

a different redundancy version; or a different modulation and coding scheme.

15. An apparatus for wireless communication, comprising:

a memory; and one or more processors operatively coupled to the memory, the memory and the one or more processors configured to:

receive, from a base station (BS), an indicator associated with a hybrid automatic repeat request (HARQ) process, wherein the indicator indicates a number of mini-slots to be bundled for a HARQ transmission of the HARQ process, wherein two or more of the mini-slots include a different portion of a same packet of the HARQ transmission, and wherein a longer length coding is used to divide and map the same packet across the two or more of the mini-slots; and receive the HARQ transmission based at least in part on the mini-slots.

\* \* \* \* \*